(12) United States Patent
Li

(10) Patent No.: US 11,546,867 B2
(45) Date of Patent: Jan. 3, 2023

(54) TRANSMISSION CONFIGURATION METHOD AND APPARATUS

(71) Applicant: BEIJING XIAOMI MOBILE SOFTWARE CO., LTD., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 13 days.

(21) Appl. No.: 17/262,694

(22) PCT Filed: Jul. 25, 2018

(86) PCT No.: PCT/CN2018/097103
§ 371 (c)(1),
(2) Date: Jan. 22, 2021

(87) PCT Pub. No.: WO2020/019218
PCT Pub. Date: Jan. 30, 2020

(65) Prior Publication Data
US 2021/0168742 A1    Jun. 3, 2021

(51) Int. Cl.
*H04W 72/00* (2009.01)
*H04W 56/00* (2009.01)
(Continued)

(52) U.S. Cl.
CPC ..... *H04W 56/001* (2013.01); *H04W 72/0493* (2013.01); *H04W 72/1289* (2013.01);
(Continued)

(58) Field of Classification Search
CPC ........... H04W 56/001; H04W 72/0493; H04W 72/1289; H04W 74/0833; H04W 76/27;
(Continued)

(56) References Cited

U.S. PATENT DOCUMENTS

| 2020/0029316 A1* | 1/2020 | Zhou ................... H04W 72/042 |
| 2021/0021320 A1* | 1/2021 | Koskela .............. H04W 56/001 |

(Continued)

FOREIGN PATENT DOCUMENTS

| CN | 103260251 A | 8/2013 |
| CN | 106533557 A | 3/2017 |

(Continued)

OTHER PUBLICATIONS

International Search Report issued in PCT/CN2018/097103 dated Mar. 27, 2019 with English translation, (4p).

(Continued)

*Primary Examiner* — Lakeram Jangbahadur
(74) *Attorney, Agent, or Firm* — Arch & Lake LLP

(57) ABSTRACT

The present disclosure relates to a transmission configuration method and terminal. The method includes: a terminal receives one or more synchronization signal blocks (SSBs) from a base station; the terminal detects one or more first SSBs that may trigger random access; and the terminal sends to a base station one or more first messages respectively corresponding to the one or more first SSBs and used to initiate random access such that the base station configures a transmission configuration indication (TCI) state set for a terminal according to the one or more first messages.

13 Claims, 14 Drawing Sheets

Detect one or more first SSBs that may trigger random access — 110

Send to a base station first messages that respectively correspond to each first SSB and that are used to initiate random access such that the base station configures a TCI state set for a terminal according to each first message — 120

(51) Int. Cl.
*H04W 76/27* (2018.01)
*H04W 72/04* (2009.01)
*H04W 72/12* (2009.01)
*H04W 74/08* (2009.01)
*H04W 80/02* (2009.01)

(52) U.S. Cl.
CPC ....... *H04W 74/0833* (2013.01); *H04W 76/27* (2018.02); *H04W 80/02* (2013.01)

(58) Field of Classification Search
CPC ............. H04W 80/02; H04W 74/0808; H04W 74/0891; H04W 74/002; H04W 74/006
See application file for complete search history.

(56) References Cited

U.S. PATENT DOCUMENTS

| | | | | |
|---|---|---|---|---|
| 2021/0037575 | A1* | 2/2021 | Ohara | H04W 72/0406 |
| 2021/0321462 | A1* | 10/2021 | Takahashi | H04W 74/02 |

FOREIGN PATENT DOCUMENTS

| | | |
|---|---|---|
| CN | 106900054 A | 6/2017 |
| CN | 106992953 A | 7/2017 |
| CN | 107872888 A | 4/2018 |
| CN | 108092754 A | 5/2018 |
| CN | 108111270 A | 6/2018 |
| CN | 108111276 A | 6/2018 |
| CN | 108111286 A | 6/2018 |
| CN | 108199819 A | 6/2018 |
| CN | 108206714 A | 6/2018 |
| CN | 108235444 A | 6/2018 |
| CN | 108260214 A | 7/2018 |
| CN | 108282212 A | 7/2018 |
| CN | 108282806 A | 7/2018 |
| WO | 2018128520 A1 | 7/2018 |
| WO | 2018129300 A1 | 7/2018 |

OTHER PUBLICATIONS

Samsung, "3GPP TSG-RAN WG2 Meeting #102 R2-1809200" Miscellaneous Corrections, May 25, 2018, (xp).
Huawei et al., "3GPP TSG-WG2 Meeting #102 R2-1809243" MAC CE Adaptation for NR for TS38.321, May 25, 2018, (xp).
Extended European Search Report issued in EP Application No. 18927785.8, dated Jul. 7, 2021, (7p).
Samsung, 3GPP TSG-RAN WG2 NR AH 1807, R2-1810778, Miscellaneous Corrections, Montreal, QC, Canada, Jul. 2-6, 2018, (29p).
First Office Action issued to Chinese Application No. 201880001657.6 dated Oct. 8, 2021 with English translation, (19p).
Ericsson_R1-1721581 (21p).
Ericsson_R1-1801186 (32p).
Notice of Allowance issued in Chinese Application No. 201880001657.6 dated Feb. 9, 2022 with English translation, (6p).
Karupongsiri, Chalakorn et al., "A Hybrid Random Access Method for Smart Meters on LTE Networks", IEEE Wireless Communications and Networking Conference (WCNC 2016)—Track 3—Mobile and Wireless Networks, (6p).
Part 1—Wu, Yali, "Uplink Resource Allocation Techniques for Massive Accesses for M2M Communications", Doctoral dissertation of Beijing University of Posts and Telecommunications, (28p).
Part 2—Wu, Yali, "Uplink Resource Allocation Techniques for Massive Accesses for M2M Communications", Doctoral dissertation of Beijing University of Posts and Telecommunications, (108p).

* cited by examiner

TRANSMISSION CONFIGURATION METHOD AND APPARATUS

CROSS-REFERENCE TO RELATED APPLICATION

This application is the national phase application of PCT Application No. PCT/CN2018/097103 filed on Jul. 25, 2018, the entire content of which is incorporated herein by reference for all purpose.

TECHNICAL FIELD

The present disclosure relates to the field of communication technology, and in particular, to a transmission configuration method and apparatus.

BACKGROUND

In the new generation communication system, the high-frequency channel attenuates quickly, and in order to ensure coverage, it is needed to use beam-based transmission and reception. In related art, the beam management process starts after the terminal completes the random access and Radio Resource Control (RRC) connection with the base station.

SUMMARY

The present disclosure provides a transmission configuration method and a terminal.

According to a first aspect of the present disclosure, there is provided a transmission configuration method. The method includes that a terminal receives one or more synchronization signal blocks (SSBs) from a base station. The method further includes that the terminal detects one or more first SSBs capable of triggering random access from the one or more SSBs; and the terminal sends to the base station one or more first messages for initiating the random access and the one or more first messages are respectively corresponding to the one or more first SSBs, so that the base station configures a transmission configuration indication (TCI) state set for the terminal according to the one or more first messages.

According to a second aspect of the present application, there is provided a transmission configuration method. The method includes that a base station sends one or more SSBs to a terminal; and the base station receives one or more first messages for initiating random access sent by the terminal. The one or more first messages respectively correspond to one or more first SSBs detected by the terminal from the one or more SSBs and capable of triggering the random access. The method also includes that the base station configures a TCI state set for the terminal according to the one or more first messages.

According to a third aspect of the present application, there is provided a terminal. The terminal includes: a processor and a memory for storing instructions executable by the processor. The processor is configured to receive one or more SSBs from a base station, detect one or more first SSBs capable of triggering random access from the one or more SSBs, and send to the base station one or more first messages for initiating the random access and the one or more first messages are respectively corresponding to the one or more first SSBs, so that the base station configures a TCI state set for the terminal according to the one or more first messages.

According to a fourth aspect of the present application, there is provided a non-transitory computer-readable storage medium with a computer program stored thereon, wherein the computer program is configured to execute the transmission configuration method according to the above first aspect.

According to a fifth aspect of the present application, there is provided a non-transitory computer-readable storage medium with a computer program stored thereon, wherein the computer program is configured to execute the transmission configuration method according to the above second aspect.

The technical solutions provided by the embodiments of the present disclosure may include the following beneficial effects.

When one or more first SSBs that can trigger random access are detected, the terminal in the present disclosure may send to the base station the first message for initiating random access corresponding to respective one of the first SSBs, so that the base station can configure the TCI state set for the terminal according to each first message, thereby improving the efficiency of transmission configuration and reducing time delay.

The terminal in the present disclosure can receive one or more first messages sent by the terminal for initiating random access, and the TCI state set can be configured for the terminal according to each first message, thereby improving the efficiency of transmission configuration and reducing the time delay.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims. The terms used in the present disclosure only tend to depict specific embodiments, rather than restricting the present disclosure. Unless the exceptional case in which the context clearly gives supports, the singular forms "a", "an", "said" and "the" used in the present disclosure and accompany claims are intended to include the plural forms. It should also be appreciated that the expression "and/or" used herein indicates including any and all possible combinations of one or more of the associated listed items.

It should be understood, although the terms first, second, third and the like are used in the present disclosure to depict various information, such information is not restricted by these terms. These terms are only used to distinguish information of the same type from each other. For example, without departing from the scope of the present disclosure, the first information may also be referred to as the second information. Similarly, the second information may also be referred to as the first information. Depending on context, the word "if" used herein may be explained to "when" or "upon" or "in response to determining . . . ".

Figure 1:
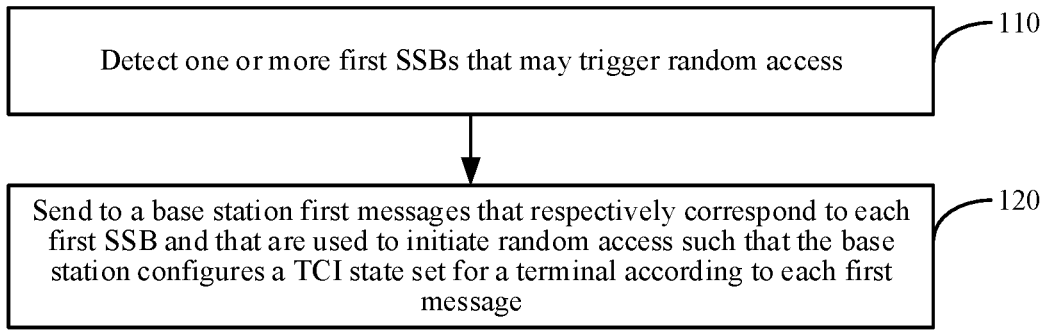
FIG. 1 is a flowchart showing a transmission configuration method according to an exemplary embodiment.
Figure 2:
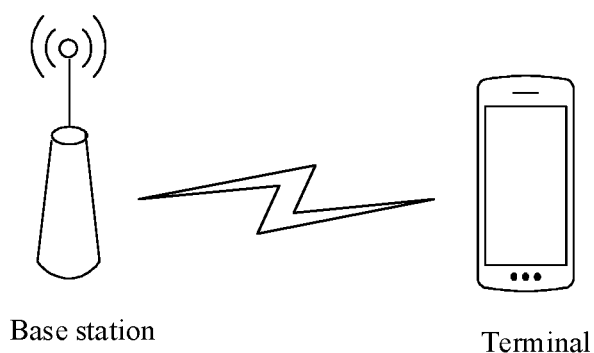
FIG. 2 is an application scenario diagram showing a transmission configuration method according to an exemplary embodiment.

FIG. 1 is a flowchart showing a transmission configuration method according to an exemplary embodiment, and FIG. 2 is an application scenario diagram of a transmission configuration method according to an exemplary embodiment. The transmission configuration method may be used in a terminal. The terminal may be a User Equipment (UE), and the base station sends one or more Synchronization Signal Blocks (SSBs) to the terminal. These SSBs may be sent by the base station to the terminal based on different beams. As shown in FIG. 1, the transmission configuration method may include the following steps 110-120.

In step 110, one or more first SSBs capable of triggering random access are detected.

In the embodiments of the present disclosure, the first SSB may be a specified SSB that can trigger random access. For example, a received power of the first SSB is greater than a specified power threshold. That is, for the terminal, a signal strength of the first SSB is relatively good, and it can guarantee to provide relatively good network services for the terminal.

After the terminal detects the SSBs based on different beams sent by the base station, it may determine which SSBs can trigger the random access and which SSBs cannot trigger the random access according to the actual situation. As for how to determine which SSBs can trigger random access, there are many determining manners, including but not limited to the following two manners.

First manner: all SSBs that meet a specified received power condition are determined as the first SSB that can trigger the random access. In other words, the received power of the first SSB only needs to meet the specified received power condition.

In this way, the specific implementation includes the following steps:

(1-1) when an initial SSB meeting the specified received power condition is detected within a specified detection window, the initial SSB may be determined as the first SSB; and (1-2) when any other SSB meeting the specified received power condition is detected within the specified detection window, the other SSB may also be determined as the first SSB.

Second manner: the initial SSB that meets the specified received power condition is determined as the first SSB that can trigger random access, and for other SSB(s) that meet the specified received power condition, it (they) may be determined as the first SSB that can trigger random access only when its (their) received power is greater than a difference between the received power of the initial SSB and a specified offset value. In other words, the received power of the initial first SSB only needs to satisfy the specified received power condition, and other first SSBs need to not only meet the specified received power condition, but also cannot be much lower than the received power of the initial first SSB.

In this way, the specific implementation includes the following steps:

(2-1) when the initial SSB meeting the specified received power condition is detected within the specified detection window, the initial SSB may be determined as the first SSB;

(2-2) when any other SSB that meets the specified received power condition is detected in the specified detection window, a difference between the received power of the initial SSB and the specified offset value is calculated; and (2-3) when the received power of other SSB is greater than the difference between the received power of the initial SSB and the specified offset value, the other SSB is also determined as the first SSB.

In an embodiment, the specified received power condition in the above-mentioned first and second manners may be that the received power of the terminal on the SSB is greater than a specified power threshold, that is, only when the detected received power of the SSB is greater than the specified power threshold, the SSB can be the first SSB that can trigger random access.

In addition, the aforementioned specified power threshold and specified offset value may be notified to the terminal by the base station through a system message.

In an embodiment, step 110 is performed, and the transmission configuration method may further include the following steps.

When it is detected that a specified stop condition is met, SSB detection is stopped. The specified stop condition may include at least one of the following:

(3-1) all SSBs that need to be detected have been detected; or (3-2) the specified number of first SSBs have been detected; or (3-3) it is necessary to start monitoring the random access feedback corresponding to the random access initiated by the first SSB.

Among them, all the SSBs that need to be detected in the above (3-1) may be all SSBs sent by the base station. For example, at least all SSBs sent by the base station have been detected once (because these SSBs are sent periodically, detecting for one period ensures that all SSBs sent by the base station may be detected at least once); the specified number in the above (3-2) may be specified by the communication protocol, or may be notified by the base station to the terminal through the system message. For example, the specified number is 64.

In addition, if the condition shown in (3-3) is met, it does not matter whether all SSBs that need to be detected have been detected in (3-1), or whether the specified number of SSBs that meet the specified received power condition are detected in (3-2), the SSB detection needs to be stopped, and it is started to monitor the random access feedback corresponding to the random access initiated by the first SSB.

In step 120, the first message for initiating random access corresponding to each first SSB is sent to the base station, so that the base station configures a TCI state set for the terminal according to each first message.

In the embodiment of the present disclosure, the first message corresponding to the first SSB may include a random access preamble corresponding to the first SSB.

In an embodiment, when step 120 is performed, the following implementation manners may be specifically adopted:

(4-1) for any first SSB, a random access time-frequency resource and random access preamble corresponding to the first SSB are determined;

(4-2) the first message corresponding to the first SSB is sent to the base station through the random access time-frequency resource corresponding to the first SSB, where the first message corresponding to the first SSB includes the random access preamble corresponding to the first SSB.

Figure 3:
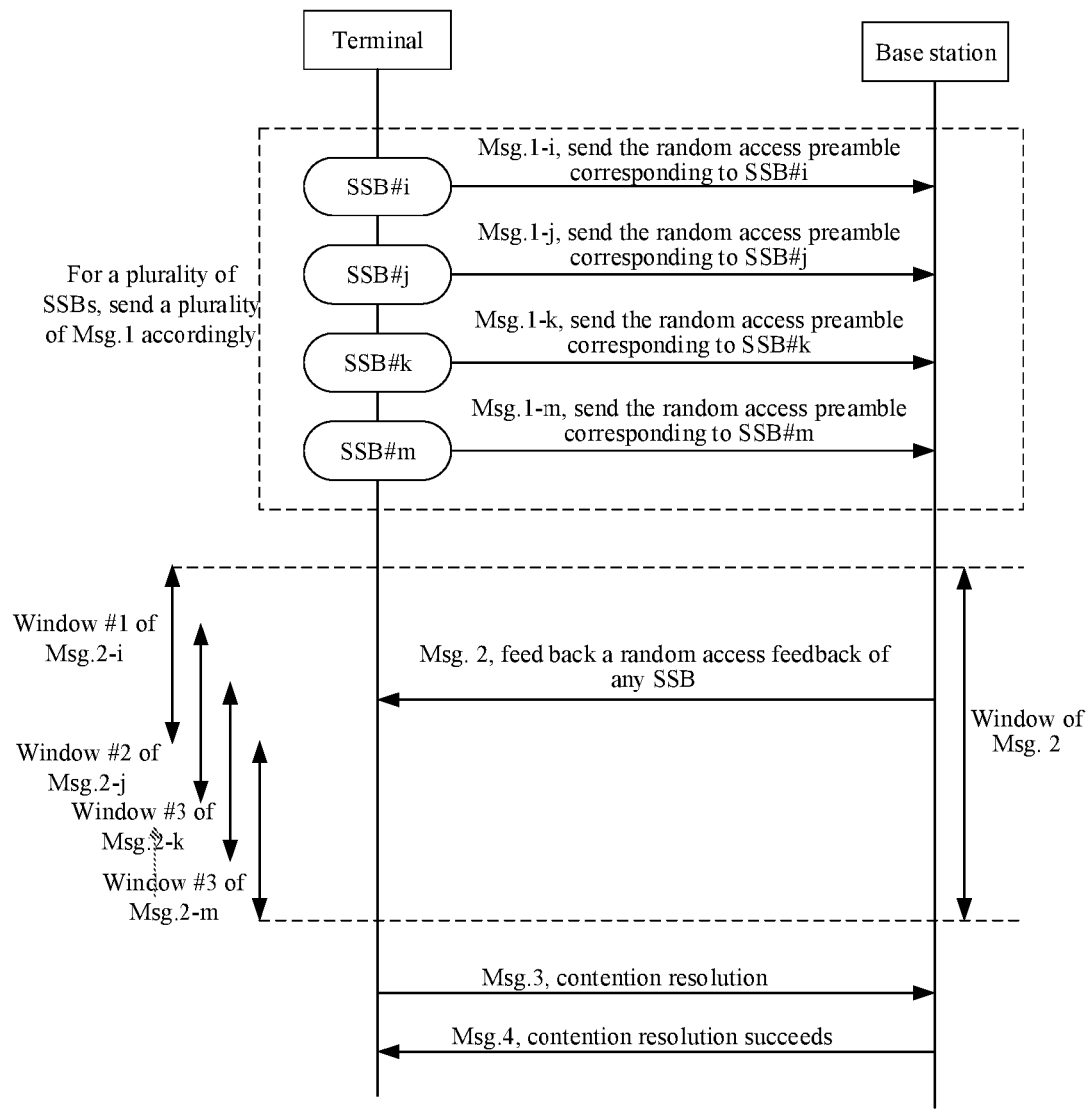
FIG. 3 is a schematic diagram showing a transmission configuration according to an exemplary embodiment.

In an example scenario, as shown in FIG. 2, a base station and a terminal are included. The base station may send one or more SSBs to the terminal. For the detected one or more first SSBs that can trigger random access, the terminal may send a first message corresponding to respective one of the first SSBs and for initiating random access to the base station. As shown in FIG. 3, the terminal sends to the base station Msg.1-*i* corresponding to SSB#i, Msg.1-*j* corresponding to SSB#j, Msg.1-*k* corresponding to SSB#k, Msg.1-*m* corresponding to SSB#m. After receiving one or more first messages for initiating random access sent by the terminal, the base station may configure the TCI state set for the terminal according to each first message.

For example, as shown in FIG. 3, the base station receives Msg.1-*i*. According to the time-frequency resource and random access preamble where the Msg.1-*i* is located, the base station knows that the terminal detects that the received power on SSB#i is relatively good and thus the corresponding random access preamble is sent on the time-frequency resource corresponding to SSB#i, then the base station can determine one TCI state, such as TCI#0, which corresponds to SSB#i, and Quasi-co-location (QCL) type to which TCI#0 corresponds is type D, type D being used for spatial Rx parameter (spatial receiving parameter), i.e., beam indication, as shown in TCI state set in Table 1:

TABLE 1

| TCI State | Reference Signal Identifier | QCI Type | Remarks |
|---|---|---|---|
| TCI#0 | SSB#i | Type D | If the base station |
| TCI#1 | SSB#j | Type D | notifies the terminal |
| ... | ... | ... | to use TCI#0, it |
| ... | ... | ... | means the base |
| ... | ... | ... | station notifies the |
|   |   |   | terminal to use the |
|   |   |   | beam when |

TABLE 1-continued

| TCI State | Reference Signal Identifier | QCI Type | Remarks |
|---|---|---|---|
| | | | receiving SSB#i to receive PDCCH or PDSCH |

It can be seen from the above embodiment that when one or more first SSBs that can trigger random access are detected, the first message for initiating random access corresponding to respective first SSB may be sent to the base station, so that the base station may configure a TCI state set for the terminal according to individual first messages, thereby improving the efficiency of transmission configuration and reducing time delay.

Figure 4:
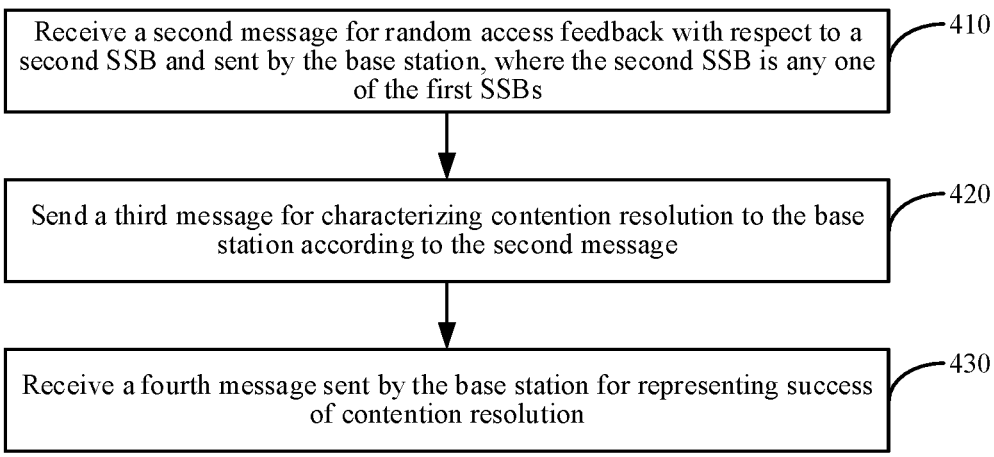
FIG. 4 is a flowchart showing another transmission configuration method according to an exemplary embodiment.

FIG. 4 is a flowchart showing another transmission configuration method according to an exemplary embodiment. The transmission configuration method may be used in a terminal and is based on the method shown in FIG. 1. As shown in FIG. 4, the method may include the following steps 410-430.

In step 410, a second message (Msg. 2 shown in FIG. 3) for random access feedback with respect to the second SSB and sent by the base station is received, where the second SSB is any one of the first SSBs.

In the embodiment of the present disclosure, no matter how many first messages are sent by the terminal to the base station, the base station only replies one second message, and the reply may be aim at any one of the plurality of first SSBs. As for which first SSB is specifically targeted, the base station may determine it according to a certain rule. For example, the base station compares the received power of each first message, and selects the first SSB corresponding to the first message with the strongest received power as the second SSB; or selects the first SSB corresponding to the first message received earliest as the second SSB.

Among them, there is a temporary Cell Radio Network Temporary Identifier (C-RNTI) in the second message. The temporary C-RNTI is a dynamic identifier assigned to the terminal by the base station, and the base station may configure the terminal with the Physical Uplink Shared Channel (PUSCH) resource for sending the third message (Msg.3).

In an embodiment, when step 410 is performed, the second message may be received within a specified time period, and the specified time period includes a time period for receiving the random access feedback corresponding to the first messages corresponding to respective first SSBs.

Specifically, the specified time period is from the start time of the time period for random access feedback corresponding to the first messages corresponding to the initial first SSB to the end time of the time period for the random access feedback corresponding to the first messages corresponding to the last first SSB. If the second message is received within the specified time period, the third message may be sent before the end of the specified time period, instead of waiting for the end of the specified time period to send the third message.

As shown in FIG. 3, after the terminal sends to the base station Msg.1-*i* corresponding to SSB#i, Msg.1-*j* corresponding to SSB#j, Msg.1-*k* corresponding to SSB#k, and Msg.1-*m* corresponding to SSB#m (that is, the terminal sends 4 first messages to the base station), it may receive the Msg.2 returned by the base station in window #1 of Msg.2-*i*, window #2 of Msg.2-*j*, window #3 of Msg.2-*k*, and window #4 of Msg.2-*m* (that is, if the terminal does not receive Msg.2 in the window #1 of Msg.2-*i*, it still needs to receive Msg. 2 within the time period corresponding to window #2 of Msg.2-*j* and for receiving random access feedback, if Msg.2 is still not received, the terminal receives Msg.2 within the time period corresponding to window #3 of Msg.2-*k* and for receiving random access feedback, and so on).

In step 420, a third message (Msg. 3 shown in FIG. 3) for characterizing contention resolution is sent to the base station according to the second message.

In the embodiment of the present disclosure, the terminal may send information including the temporary C-RNTI on the PUSCH resource allocated by the second message.

In step 430, a fourth message (Msg. 4 as shown in FIG. 3) sent by the base station for representing success of contention resolution is received.

In the embodiment of the present disclosure, in the fourth message, the base station sends a Physical Downlink Shared Channel (PDSCH) carrying a contention cancellation identifier to the terminal, and the terminal learns that the random access is successful.

It can be seen from the above embodiment that the second message sent by the base station for random access feedback with respect to the second SSB is received, the second SSB being any one of the first SSBs, the third message for characterizing contention resolution is sent to the base station according to the second message, and the fourth message for indicating the success of the contention resolution sent by the base station is received, in this way, the base station can better determine the random access with the terminal according to each first message, thereby improving the random access reliability, and also improving the quality of service provided by the base station to the terminal.

Figure 5:
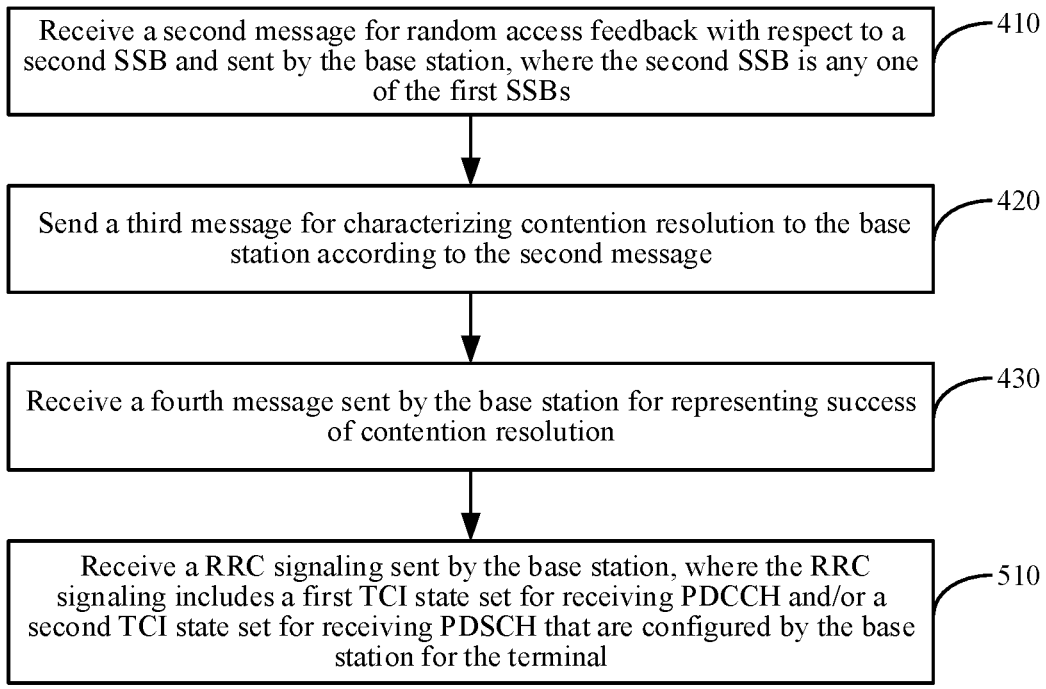
FIG. 5 is a flowchart showing another transmission configuration method according to an exemplary embodiment.

FIG. 5 is a flowchart showing another transmission configuration method according to an exemplary embodiment. The transmission configuration method may be used in a terminal, and is based on the method shown in FIG. 4. When or after performing step 430, as shown in FIG. 5, the transmission configuration method may further include the following step 510.

In step 510, a RRC signaling sent by the base station is received. The RRC signaling includes a first Transmission Configuration Indication (TCI) state set for receiving Physical Downlink Control Channel (PDCCH) and/or a second TCI state set for receiving PDSCH that are configured by the base station for the terminal. The first TCI state set includes a first corresponding relationship between the TCI state identifier for receiving the PDCCH and the SSB identifier, and the second TCI state set includes a second corresponding relationship between the TCI state identifier for receiving the PDSCH and the SSB identifier.

In the embodiment of the present disclosure, the first corresponding relationship may refer to the corresponding relationship between the TCI state identifier used for receiving the PDCCH and the SSB identifier. In addition, the quasi co-location (QCL) type corresponding to the TCI state identifier used for receiving the PDCCH is type D, and the type D is used for a spatial Rx parameter (spatial receiving parameter), that is, a beam indication.

The second corresponding relationship may refer to the corresponding relationship between the TCI state identifier used for receiving the PDSCH and the SSB identifier. In addition, the quasi co-location (QCL) type corresponding to the TCI state identifier used for receiving the PDSCH is type D, and the type D is used for the spatial Rx parameter (spatial receiving parameter), that is, beam indication.

The base station may send the RRC signaling carrying the first TCI state set and/or the second TCI state set while sending the fourth message; or it may send the RRC signaling carrying the first TCI state set and/or the second TCI state set after sending the fourth message. Therefore, the terminal may receive the RRC signaling carrying the first TCI state set and/or the second TCI state set while receiving the fourth message; or it may receive the RRC signaling carrying the first TCI state set and/or the second TCI state set after receiving the fourth message.

In addition, the first TCI state set or the second TCI state set configured by the base station for the terminal may include only one TCI state identifier, or may include multiple TCI state identifiers. If only one TCI state identifier is included, when receiving the PDCCH or PDSCH, the terminal may directly use the same receiving beam as that of SSB specified by or corresponding to the SSB identifier corresponding to the TCI state identifier; and if multiple TCI state identifiers are included, when receiving the PDCCH or the PDSCH, the terminal needs to receive the TCI state identifier that is reactivated or indicated by the base station (see the embodiments shown in FIGS. 6 and 7).

It can be seen from the above embodiment that when or after receiving the fourth message sent by the base station to indicate the success of the contention resolution, the RRC signaling sent by the base station is received. The RRC signaling includes the first TCI state set for receiving the PDCCH and/or the second TCI state set for receiving the PDSCH that are configured by the base station for the terminal, thereby improving the reliability of receiving the TCI state set(s), and avoiding time delay.

Figure 6:
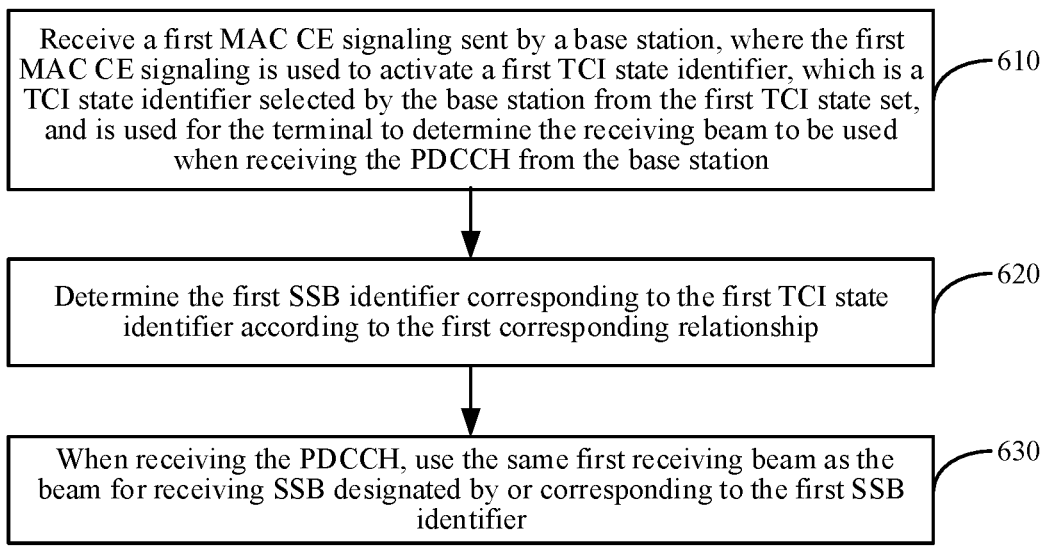
FIG. 6 is a flowchart showing another transmission configuration method according to an exemplary embodiment.

FIG. 6 is a flowchart showing another transmission configuration method according to an exemplary embodiment. The transmission configuration method may be used in a terminal and is based on the method shown in FIG. 5. The first TCI state set includes at least two TCI state identifiers; as shown in FIG. 6, the transmission configuration method may further include the following steps 610-630.

In step 610, a first medium access control (MAC) control element (CE) signaling sent by a base station is received. The first MAC CE signaling is used to activate a first TCI state identifier, which is a TCI state identifier selected by the base station from the first TCI state set, and is used for the terminal to determine the receiving beam to be used when receiving the PDCCH from the base station.

In the embodiment of the present disclosure, the first MAC CE signaling is used to activate the first TCI state identifier. For example, the first TCI state set includes 64 TCI state identifiers, and the base station may select one of the 64 TCI state identifiers as the first TCI state identifier.

In step 620, the first SSB identifier corresponding to the first TCI state identifier is determined according to the first corresponding relationship. The first corresponding relationship is located in the first TCI state set.

In step 630, when receiving the PDCCH, the same first receiving beam as the beam for receiving SSB designated by or corresponding to the first SSB identifier is used.

It can be seen from the above embodiment that the first MAC CE signaling sent by the base station is received, the first MAC CE signaling being used to activate the first TCI state identifier, which is selected by the base station from the first TCI state set, the first SSB identifier corresponding to the first TCI state identifier is determined according to the first corresponding relationship, and the same first receiving beam as that of the SSB designated by or corresponding to the first SSB identifier is used when receiving the PDCCH, in this way, the transmission configuration for PDCCH reception is realized, and the reliability of the transmission configuration is improved.

Figure 7:
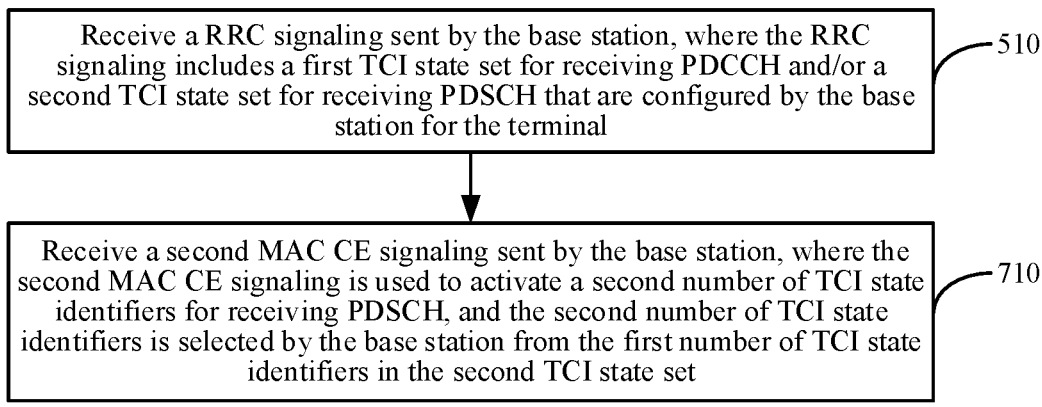
FIG. 7 is a flowchart showing another transmission configuration method according to an exemplary embodiment.

FIG. 7 is a flowchart showing another transmission configuration method according to an exemplary embodiment. The transmission configuration method can be used in a terminal and is based on the method shown in FIG. 5. The second TCI state set includes a first number of TCI state identifiers, and the first number is greater than 1. As shown in FIG. 7, the transmission configuration method may further include the following step 710.

In step 710, a second MAC CE signaling sent by the base station is received. The second MAC CE signaling is used to activate a second number of TCI state identifiers for receiving PDSCH, and the second number of TCI state identifiers is selected by the base station from the first number of TCI state identifiers in the second TCI state set.

In the embodiment of the present disclosure, the second number is less than the first number. For example, the first number is 64 and the second number is 8. For PDSCH, the base station may select 8 TCI state identifiers from 64 TCI state identifiers, and use the second MAC CE signaling to notify the terminal.

It can be seen from the above embodiment that by receiving the second MAC CE signaling sent by the base station, the second MAC CE signaling being used to activate the second number of TCI state identifiers for receiving PDSCH, and the second number of TCI state identifiers being selected by the base station from the first number of TCI state identifiers, the transmission configuration for receiving PDSCH is realized and the reliability of the transmission configuration is improved.

Figure 8:
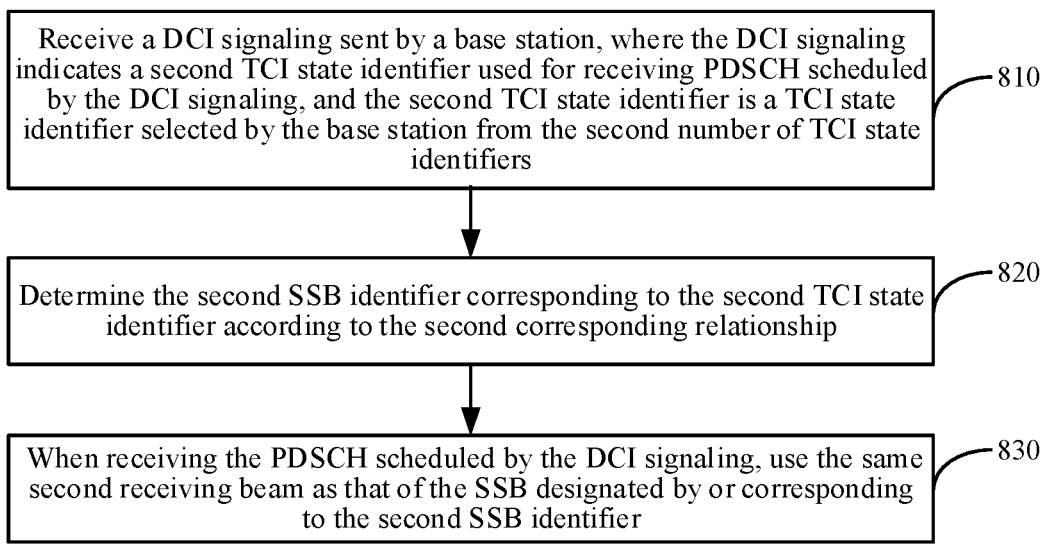
FIG. 8 is a flowchart showing another transmission configuration method according to an exemplary embodiment.

FIG. 8 is a flowchart showing another transmission configuration method according to an exemplary embodiment. The transmission configuration method may be used in a terminal and is based on the method shown in FIG. 7, where the second number is greater than 1. As shown in FIG. 8, the transmission configuration method may further include the following steps 810-830.

In step 810, a Downlink Control Information (DCI) signaling sent by a base station is received, where the DCI signaling indicates a second TCI state identifier used for receiving PDSCH scheduled by the DCI signaling, and the second TCI state identifier is a TCI state identifier selected by the base station from the second number of TCI state identifiers.

In the embodiment of the present disclosure, the second number is greater than 1. For example, the second number is 8. The base station may select one of the eight TCI state identifiers as the second TCI state identifier.

In step 820, the second SSB identifier corresponding to the second TCI state identifier is determined according to the second corresponding relationship. The second corresponding relationship is in the second TCI state set.

In step 830, when receiving the PDSCH scheduled by the DCI signaling, the same second receiving beam as that of the SSB designated by or corresponding to the second SSB identifier is used.

It can be seen from the above embodiment that the DCI signaling sent by the base station is received, the DCI signaling indicating the second TCI state identifier used for the reception of the PDSCH scheduled by the DCI signaling, and the second TCI state identifier being one TCI state identifier selected by the base station from the second number of TCI state identifiers; the second SSB identifier corresponding to the second TCI state identifier is determined according to the second corresponding relationship;

and the second receiving beam that is the same as the beam for receiving the SSB designated by or corresponding to the second SSB identifier when receiving the PDSCH scheduled by the DCI signaling is used, in this way, the transmission configuration for receiving PDSCH scheduled by DCI signaling is realized, and the reliability of the transmission configuration is improved.

Figure 9:
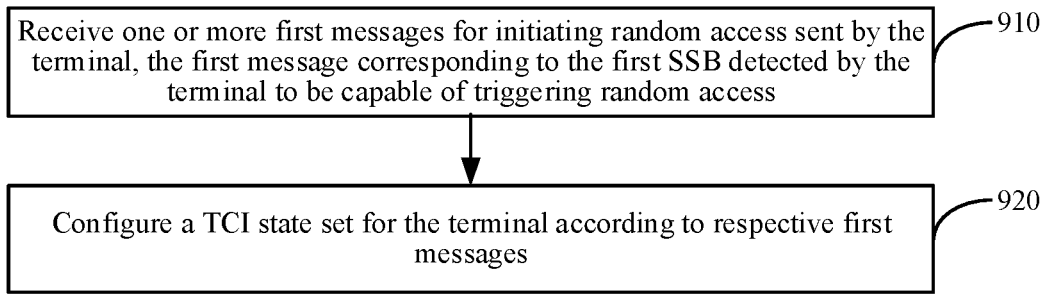
FIG. 9 is a flowchart showing a transmission configuration method according to an exemplary embodiment.

FIG. 9 is a flowchart showing a transmission configuration method according to an exemplary embodiment. The transmission configuration method may be used in a base station. The base station sends one or more SSBs to the terminal, and these SSBs may be sent to the terminal by the base station based on different beams. As shown in FIG. 9, the transmission configuration method may include the following steps 910-920.

In step 910, one or more first messages (Msg.1) for initiating random access sent by the terminal are received, the first message corresponding to the first SSB detected by the terminal to be capable of triggering random access.

In the embodiments of the present disclosure, the first SSB may specify the SSB that can trigger random access determined by the terminal according to actual conditions.

In an embodiment, the first message corresponding to the first SSB may include a random access preamble corresponding to the first SSB.

In step 920, a TCI state set is configured for the terminal according to respective first messages.

In the embodiment of the present disclosure, the TCI state set configured by the terminal may include a first TCI state set for receiving PDCCH and/or a second TCI state set for receiving PDSCH.

In an embodiment, when step 920 is performed, the following implementation manners may be adopted.

According to respective first messages, a first TCI state set for receiving PDCCH and/or a second TCI state set for receiving PDSCH are configured for the terminal, where the first TCI state set includes a first corresponding relationship between the TCI state identifier for receiving PDCCH and the SSB identifier, and the second TCI state set includes a second corresponding relationship between the TCI state identifier for receiving the PDSCH and the SSB identifier.

The first corresponding relationship may refer to the corresponding relationship between the TCI state identifier for receiving the PDCCH and the SSB identifier. In addition, the quasi co-location (QCL) type corresponding to the TCI state identifier for receiving the PDCCH is type D, which is used for the spatial Rx parameter (spatial receiving parameter), that is, the beam indication, which can be seen in Table 1.

The second corresponding relationship may refer to the corresponding relationship between the TCI state identifier for receiving the PDSCH and the SSB identifier. In addition, the quasi co-location (QCL) type corresponding to the TCI state identifier for receiving the PDSCH is type D, which is used for the spatial Rx parameter (spatial receiving parameter), that is, the beam indication, which can be seen in Table 1.

It can be seen from the above embodiment that by receiving one or more first messages sent by the terminal for initiating random access, and configuring the TCI state set for the terminal according to each first message, the efficiency of transmission configuration is improved, and the time delay is reduced.

Figure 10:
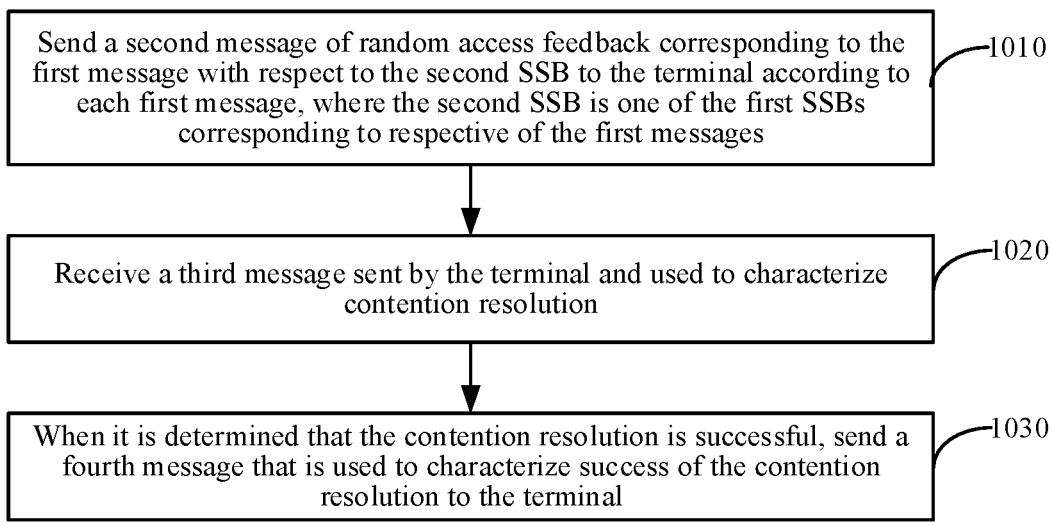
FIG. 10 is a flowchart showing another transmission configuration method according to an exemplary embodiment.

FIG. 10 is a flowchart showing another transmission configuration method according to an exemplary embodiment. The transmission configuration method may be used in a base station and is based on the method shown in FIG. 9. As shown in FIG. 10, the configuration method may also include the following steps 1010-1030.

In step 1010, a second message (Msg.2 shown in FIG. 3) of random access feedback corresponding to the first message with respect to the second SSB is sent to the terminal according to each first message, where the second SSB is one of the first SSBs corresponding to respective of the first messages.

In step 1020, a third message (Msg.3 shown in FIG. 3) sent by the terminal and used to characterize contention resolution is received.

In step 1030, when it is determined that the contention resolution is successful, a fourth message (Msg. 4 shown in FIG. 3) that is used to characterize success of the contention resolution is sent to the terminal.

It can be seen from the above embodiment that the second message of random access feedback corresponding to the first message with respect to the second SSB can be sent to the terminal according to each first message, where the second SSB is one of the first SSBs, the third message used to characterize the contention resolution sent by the terminal is received, and when it is determined that the contention resolution is successful, the fourth message used to characterize the success of the contention resolution is sent to the terminal, so that the base station can better determine the random access with the terminal according to each first message, thereby improving the reliability of random access and also improving the quality of service provided by the base station to the terminal.

Figure 11:
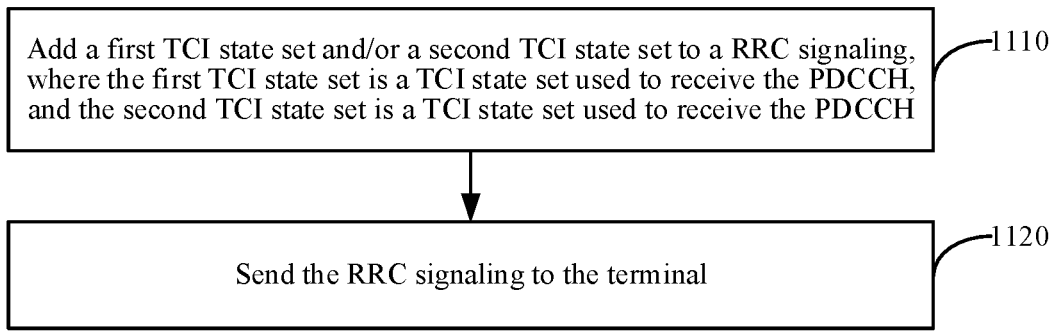
FIG. 11 is a flowchart showing another transmission configuration method according to an exemplary embodiment.

FIG. 11 is a flowchart showing another transmission configuration method according to an exemplary embodiment. The transmission configuration method can be used in a base station and is based on the method shown in FIG. 10. As shown in FIG. 11, while performing the step 1030 or after performing the step 1030, the following steps 1110-1120 may be included.

In step 1110, the first TCI state set and/or the second TCI state set are added to the RRC signaling. The first TCI state set is a TCI state set used to receive the PDCCH, and the second TCI state set is a TCI state set used to receive the PDCCH.

In step 1120, the RRC signaling is sent to the terminal.

It can be seen from the above embodiment that when or after sending the fourth message for indicating the success of contention resolution to the terminal, the first TCI state set and/or the second TCI state set can be added to the RRC signaling, and the RRC signaling is sent to the terminal, thereby improving the reliability of transmitting the TCI state set and avoiding time delay.

Figure 12:
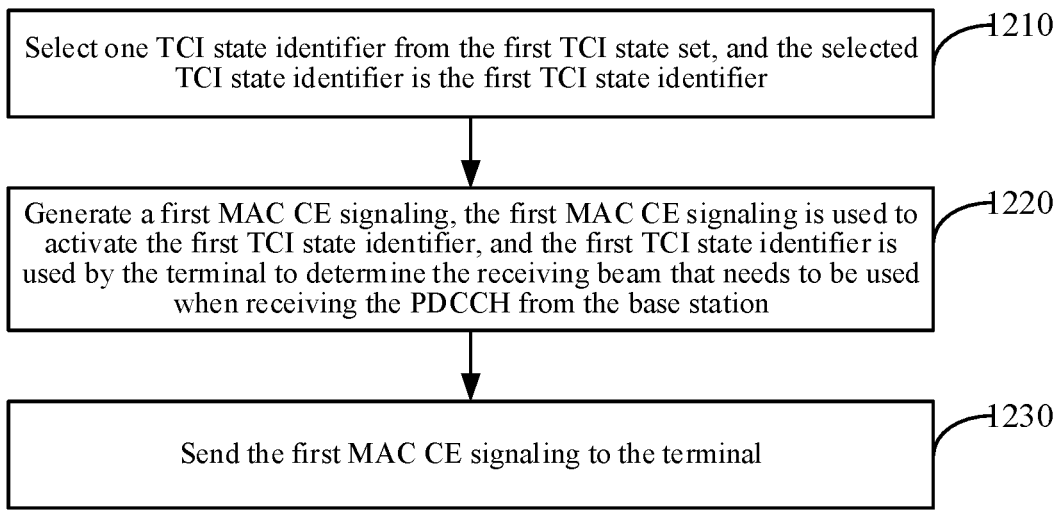
FIG. 12 is a flowchart showing another transmission configuration method according to an exemplary embodiment.

FIG. 12 is a flowchart showing another transmission configuration method according to an exemplary embodiment. The transmission configuration method can be used in a base station and is based on the method shown in FIG. 11. The first TCI state set includes at least two TCI state identifiers. As shown in FIG. 12, the transmission configuration method may further include the following steps 1210-1230.

In step 1210, one TCI state identifier is selected from the first TCI state set, and the selected TCI state identifier is the first TCI state identifier.

In step 1220, a first MAC CE signaling is generated, the first MAC CE signaling is used to activate the first TCI state identifier, and the first TCI state identifier is used by the terminal to determine the receiving beam that needs to be used when receiving the PDCCH from the base station.

In step 1230, the first MAC CE signaling is sent to the terminal.

It can be seen from the above embodiment that by selecting the first TCI state identifier from the first TCI state set, and using the first MAC CE signaling to activate the first TCI state identifier for the terminal to receive the PDCCH from the base station, the transmission configuration used for PDCCH reception is realized, and the reliability of the transmission configuration is also improved.

Figure 13:
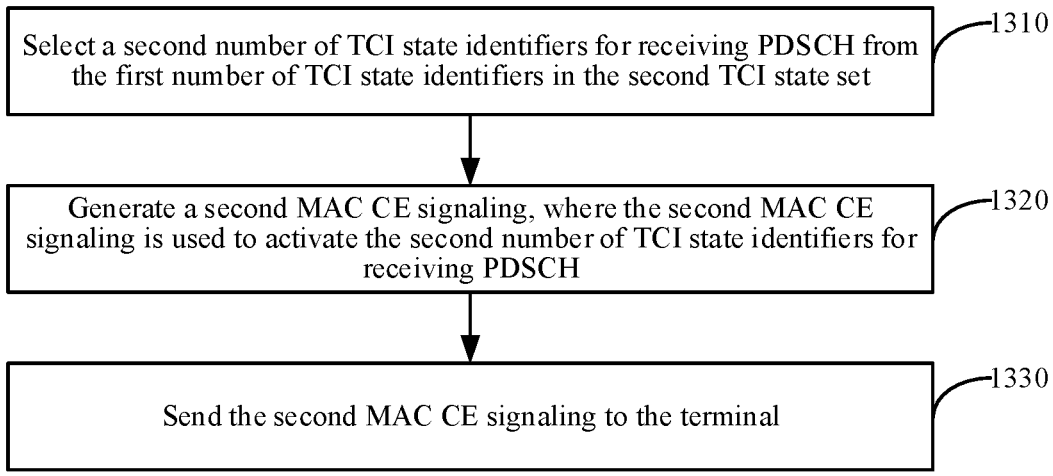
FIG. 13 is a flowchart showing another transmission configuration method according to an exemplary embodiment.

FIG. 13 is a flowchart showing another transmission configuration method according to an exemplary embodiment. The transmission configuration method can be used in a base station and is based on the method shown in FIG. 11. The second TCI state set includes a first number of TCI state identifiers, and the first number is greater than 1. As shown in FIG. 13, the transmission configuration method may further include the following steps 1310-1330.

In step 1310, a second number of TCI state identifiers for receiving PDSCH are selected from the first number of TCI state identifiers in the second TCI state set.

In step 1320, a second MAC CE signaling is generated, and the second MAC CE signaling is used to activate the second number of TCI state identifiers for receiving PDSCH.

In step 1330, the second MAC CE signaling is sent to the terminal.

It can be seen from the above embodiment that the second number of TCI state identifiers for receiving PDSCH are selected from the first number of TCI state identifiers, the second MAC CE signaling is generated, the second MAC CE signaling being used to activate the second number of TCI state identifiers for the receiving PDSCH, and the second MAC CE signaling is sent to the terminal, thereby realizing the transmission configuration for receiving PDSCH and also improving the reliability of the transmission configuration.

Figure 14:
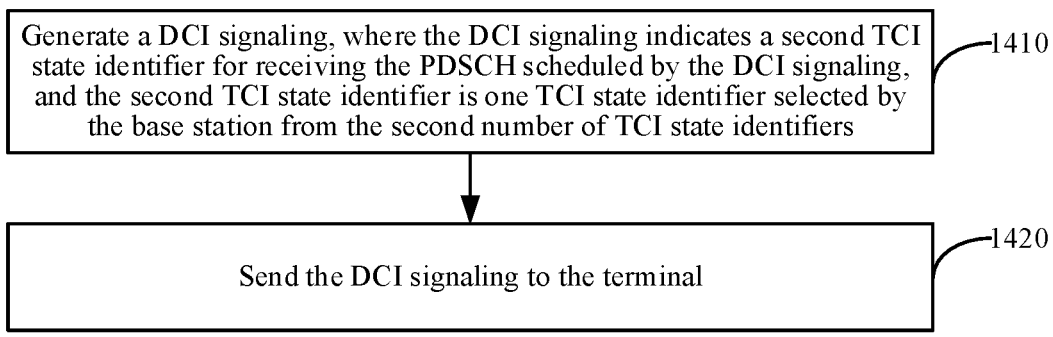
FIG. 14 is a flowchart showing another transmission configuration method according to an exemplary embodiment.

FIG. 14 is a flowchart showing another transmission configuration method according to an exemplary embodiment. The transmission configuration method can be used in a base station and is based on the method shown in FIG. 13, where the second number is greater than 1. As shown in FIG. 14, the transmission configuration method may further include the following steps 1410-1420.

In step 1410, a DCI signaling is generated. The DCI signaling indicates the second TCI state identifier for receiving the PDSCH scheduled by the DCI signaling. The second TCI state identifier is one TCI state identifier selected by the base station from the second number of TCI state identifiers.

In step 1420, the DCI signaling is sent to the terminal.

It can be seen from the above embodiment that by generating the DCI signaling, the DCI signaling indicating the second TCI state identifier for receiving the PDSCH scheduled by the DCI signaling, and the second TCI state identifier being one TCI state identifier selected by the base station from the second number of TCI state identifiers, and the DCI signaling is sent to the terminal, thereby realizing the transmission configuration for receiving PDSCH scheduled by the DCI signaling, and also improving the reliability of the transmission configuration.

Corresponding to the foregoing embodiments of the transmission configuration method, the present disclosure also provides an embodiment of a transmission configuration apparatus.

Figure 15:
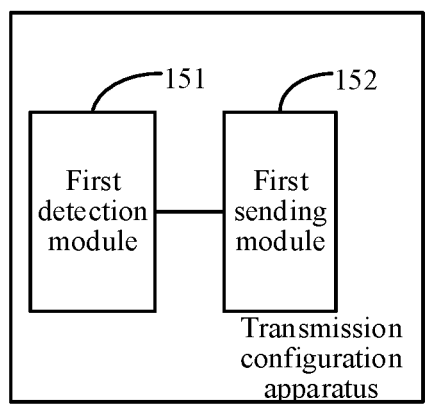
FIG. 15 is a block diagram showing a transmission configuration apparatus according to an exemplary embodiment.

FIG. 15 is a block diagram showing a transmission configuration apparatus according to an exemplary embodiment. The apparatus is used in a terminal. The terminal may be a UE. The base station sends one or more SSBs to the terminal, and these SSBs may be sent to the terminal by the base station based on different beams. The transmission configuration apparatus is used to perform the transmission configuration method shown in FIG. 1. As shown in FIG. 15, the transmission configuration apparatus may include:

a first detection module 151, configured to detect one or more first SSBs that can trigger random access;

a first sending module 152, configured to send to the base station a first message for initiating random access corresponding to respective one of the first SSBs, so that the base station configures a transmission configuration indication (TCI) state set for the terminal according to each of the first messages.

It can be seen from the above embodiment that when one or more first SSBs that can trigger random access are detected, the first message for initiating random access corresponding to each first SSB can be sent to the base station, so that the base station can configure the TCI state set for the terminal according to each first message, thereby improving the efficiency of transmission configuration and reducing time delay.

Figure 16:
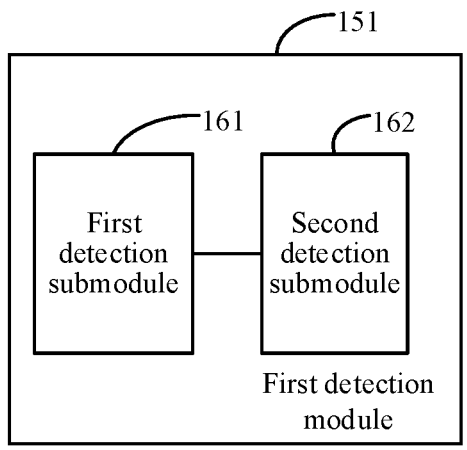
FIG. 16 is a block diagram showing another transmission configuration apparatus according to an exemplary embodiment.

In an embodiment, based on the apparatus shown in FIG. 15, as shown in FIG. 16, the first detection module 151 may include:

a first detection submodule 161, configured to, when an initial SSB that meets a specified received power condition is detected within a specified detection window, determine the initial SSB as the first SSB; and a second detection submodule 162, configured to, when any other SSB meeting the specified received power condition is detected within the specified detection window, determine the other SSB as the first SSB.

Figure 17:
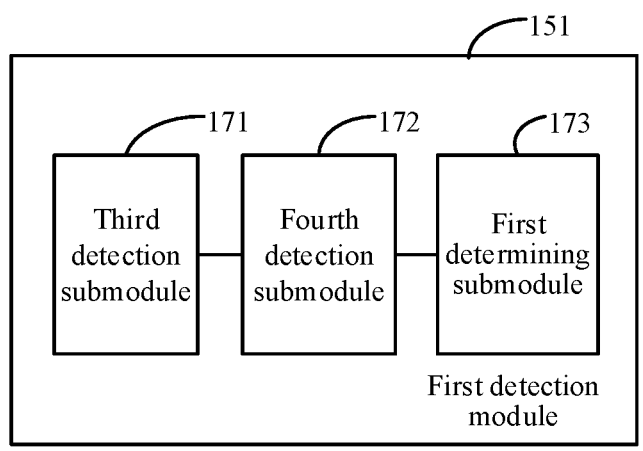
FIG. 17 is a block diagram showing another transmission configuration apparatus according to an exemplary embodiment.

In an embodiment, based on the apparatus shown in FIG. 15, as shown in FIG. 17, the first detection module 151 may include:

a third detection submodule 171, configured to, when an initial SSB that meets the specified received power condition is detected within the specified detection window, determine the initial SSB as the first SSB;

a fourth detection submodule 172, configured to, when any other SSB meeting the specified received power condition is detected in the specified detection window, calculate a difference between a received power of the initial SSB and a specified offset value; and a first determining submodule 173, configured to, when the received power of the other SSB is greater than the difference, determine the other SSB as the first SSB.

Figure 18:
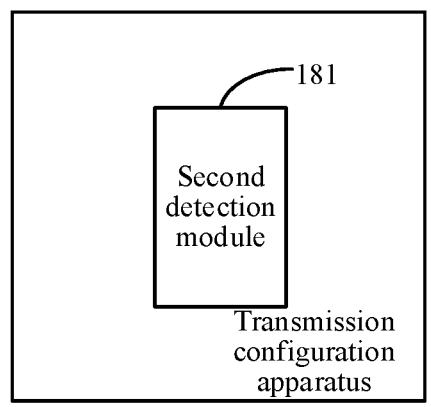
FIG. 18 is a block diagram showing another transmission configuration apparatus according to an exemplary embodiment.

In an embodiment, based on the apparatus shown in FIG. 16 or FIG. 17, the specified received power condition is that the SSB received power is greater than a specified power threshold; as shown in FIG. 18, the apparatus may further include:

a second detection module 181, configured to stop SSB detection when it is detected that a specified stop condition is met, where the specified stop condition includes at least one of the following: all SSBs that need to be detected are detected; or a specified number of the first SSB has been detected; or it is necessary to start monitoring the random access feedback corresponding to the random access initiated by the initial SSB.

Figure 19:
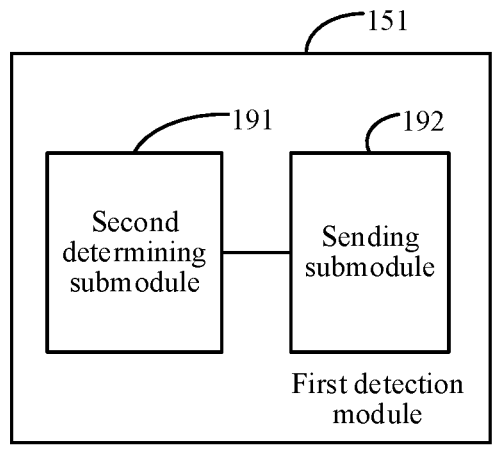
FIG. 19 is a block diagram showing another transmission configuration apparatus according to an exemplary embodiment.

In an embodiment, based on the apparatus shown in FIG. 15, as shown in FIG. 19, the first sending module 152 may include:

a second determining submodule 191, configured to, for any one of the first SSBs, determine a random access time-frequency resource and a random access preamble corresponding to the first SSB; and a, configured to send a first message corresponding to the first SSB to the base station through the random access time-frequency resource corresponding to the first SSB, where the first message corresponding to the first SSB includes the random access preamble corresponding to the first SSB.

Figure 20:
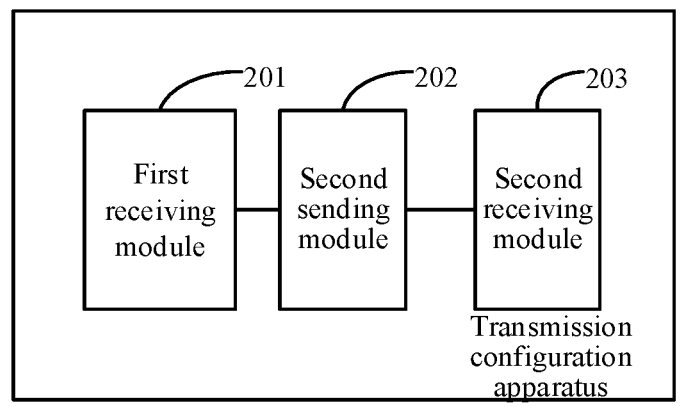
FIG. 20 is a block diagram showing another transmission configuration apparatus according to an exemplary embodiment.

In an embodiment, based on the apparatus shown in FIG. 15, as shown in FIG. 20, the apparatus may further include:

a first receiving module 201, configured to receive a second message sent by the base station for random access feedback with respect to a second SSB, where the second SSB is any one of the first SSBs;

a second sending module 202, configured to send a third message for characterizing contention resolution to the base station according to the second message; and a second receiving module 203, configured to receive a fourth message sent by the base station and used to characterize success of the contention resolution.

It can be seen from the above embodiment that by receiving the second message sent by the base station for random access feedback with respect to the second SSB, the second SSB being any one of the first SSBs, by sending the second message to the base station to characterize contention according to the second message, and by receiving the fourth message sent by the base station and used to characterize the success of the contention resolution, the base station can better determine the random access with the terminal according to each first message, thereby improving the reliability of random access, and also improving the quality of service provided by the base station to the terminal.

Figure 21:
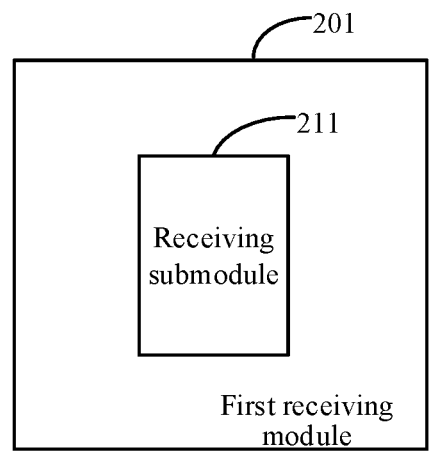
FIG. 21 is a block diagram showing another transmission configuration apparatus according to an exemplary embodiment.

In an embodiment, based on the apparatus shown in FIG. 20, as shown in FIG. 21, the first receiving module 201 may include:

a receiving submodule 211, configured to receive the second message within a specified time period, where the specified time period includes a time period for receiving random access feedback corresponding to each of the first SSBs.

Figure 22:
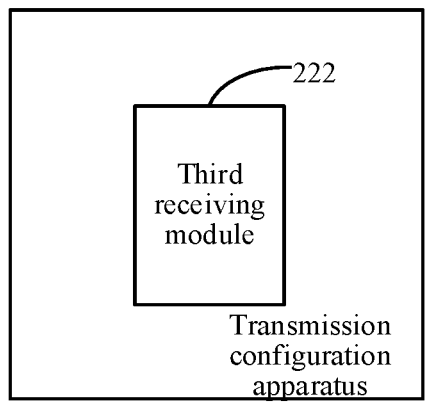
FIG. 22 is a block diagram showing another transmission configuration apparatus according to an exemplary embodiment.

In an embodiment, based on the apparatus shown in FIG. 20, as shown in FIG. 22, the apparatus may further include:

a third receiving module 222, configured to receive radio resource control (RRC) signaling sent by the base station when or after receiving the fourth message sent by the base station for indicating successful contention resolution, where the RRC signaling includes the first transmission configuration indication (TCI) state set for receiving the PDCCH and/or the second TCI state set for receiving the PDSCH that are configured by the base station for the terminal, the first TCI state set includes a first corresponding relationship between the TCI state identifier for receiving the PDCCH and the SSB identifier, and the second TCI state set includes a second corresponding relationship between the TCI state identifier for receiving the PDSCH and the SSB identifier.

It can be seen from the above embodiment that when or after receiving the fourth message indicating the success of the contention resolution sent by the base station, the RRC signaling sent by the base station is received. The RRC signaling includes the first TCI state set for receiving the PDCCH and/or the second TCI state set for receiving the PDSCH, which are configured by the base station for the terminal. Therefore, the reliability of receiving the TCI state set is improved, and the time delay is avoided.

Figure 23:
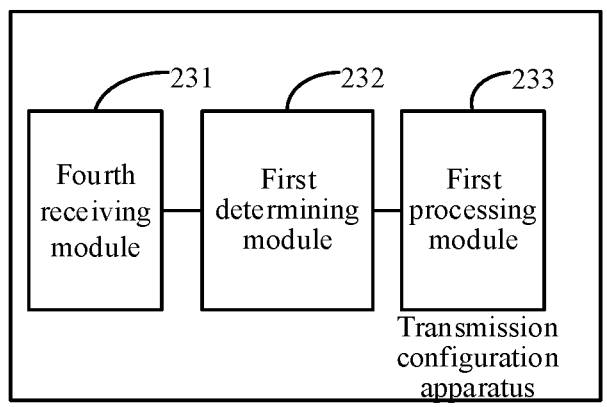
FIG. 23 is a block diagram showing another transmission configuration apparatus according to an exemplary embodiment.

In an embodiment, based on the apparatus shown in FIG. 22, the first TCI state set includes at least two TCI state identifiers; as shown in FIG. 23, the apparatus may further include:

a fourth receiving module 231, configured to receive a first MAC CE signaling sent by the base station, where the first MAC CE signaling is used to activate a first TCI state identifier, and the first TCI state identifier is one TCI state identifier selected by the base station from the first TCI state set, and is used for the terminal to determine the receiving beam to be used when receiving the PDCCH from the base station;

a first determining module 232, configured to determine the first SSB identifier corresponding to the first TCI state identifier according to the first corresponding relationship;

a first processing module 233, configured to use the same first receiving beam as that of the SSB designated by or corresponding to the first SSB identifier when receiving the PDCCH.

It can be seen from the above embodiment that by receiving the first MAC CE signaling sent by the base station, the first MAC CE signaling being used to activate the first TCI state identifier, and the first TCI state identifier being selected by the base station from the first TCI state set, and by determining the first SSB identifier corresponding to the first TCI state identifier according to the first corresponding relationship, and by using the same first receiving beam as that of the SSB designated by or corresponding to the first SSB identifier when receiving the PDCCH, the transmission configuration for PDCCH reception is realized, and the reliability of the transmission configuration is also improved.

Figure 24:
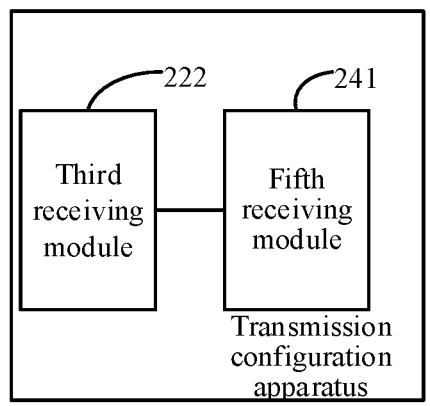
FIG. 24 is a block diagram showing another transmission configuration apparatus according to an exemplary embodiment.

In an embodiment, based on the apparatus shown in FIG. 22, the second TCI state set includes a first number of TCI state identifiers, and the first number is greater than 1; as shown in FIG. 24, the apparatus may also include:

a fifth receiving module 241, configured to receive a second MAC CE signaling sent by the base station, where the second MAC CE signaling is used to activate a second number of TCI state identifiers for receiving PDSCH, and the second number of TCI state identifiers is selected by the base station from the first number of TCI state identifiers in the second TCI state set.

It can be seen from the above embodiment that by receiving the second MAC CE signaling sent by the base station, the second MAC CE signaling being used to activate the second number of TCI state identifiers for receiving PDSCH, and the second number of TCI state identifiers being selected by the base station from the first number of TCI state identifiers, the transmission configuration for receiving PDSCH is realized, and the reliability of the transmission configuration is also improved.

Figure 25:
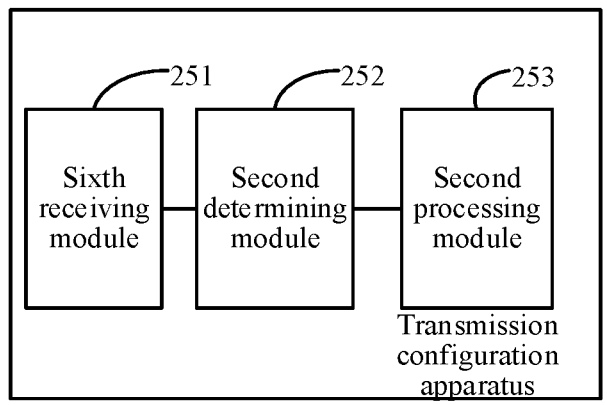
FIG. 25 is a block diagram showing another transmission configuration apparatus according to an exemplary embodiment.

In an embodiment, based on the apparatus shown in FIG. 24, the second number is greater than 1. As shown in FIG. 25, the apparatus may further include:

a sixth receiving module 251, configured to receive a downlink control information (DCI) signaling sent by the base station, where the DCI signaling indicates a second TCI state identifier used for receiving PDSCH scheduled by the DCI signaling, and the second TCI state identifier is a TCI state identifier selected by the base station from the second number of TCI state identifiers;

a second determining module 252, configured to determine a second SSB identifier corresponding to the second TCI state identifier according to the second corresponding relationship; and a second processing module 253, configured to use the same second receiving beam as that of the SSB indicated by or corresponding to the second SSB identifier when receiving the PDSCH scheduled by the DCI signaling.

It can be seen from the above embodiment that by receiving the DCI signaling sent by the base station, the DCI signaling indicating the second TCI state identifier used for the reception of the PDSCH scheduled by the DCI signaling, and the second TCI state identifier being one TCI state identifier selected by the base station from the second number of TCI state identifiers, and by determining the second SSB identifier corresponding to the second TCI state identifier according to the second corresponding relationship, and using the same second receiving beam as that of the SSB specified by or corresponding to the second SSB identifier when receiving the PDCCH scheduled by the DCI signaling, the transmission configuration for receiving PDSCH scheduled by DCI signaling is realized, and the reliability of the transmission configuration is also improved.

Figure 26:
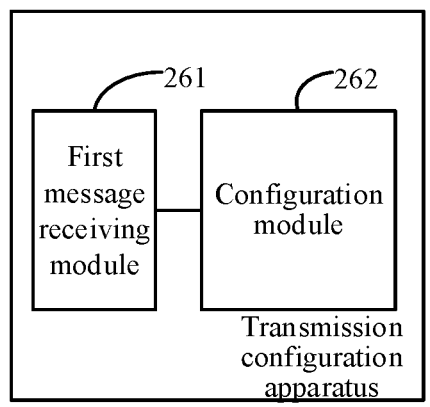
FIG. 26 is a block diagram showing a transmission configuration apparatus according to an exemplary embodiment.

FIG. 26 is a block diagram showing a transmission configuration apparatus according to an exemplary embodiment. The apparatus is used in a base station. The base station sends one or more SSBs to the terminal, and these SSBs may be sent by the base station to the terminal based on different beams. The transmission configuration apparatus is used to perform the transmission configuration method shown in FIG. 9. As shown in FIG. 26, the transmission configuration apparatus may include:

a first message receiving module 261, configured to receive one or more first messages for initiating random access sent by the terminal, where the first message is corresponding to the first SSB that is detected by the terminal to be capable of triggering random access; and a configuration module 262, configured to configure a TCI state set for the terminal according to each of the first messages.

It can be seen from the above embodiment that by receiving one or more first messages sent by the terminal for initiating random access, and configuring the TCI state set for the terminal according to each first message, the efficiency of transmission configuration is improved, and the time delay is reduced.

Figure 27:
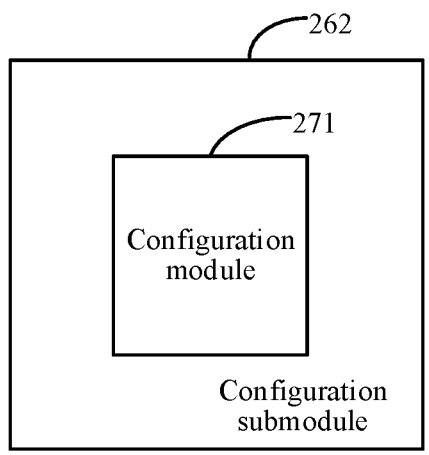
FIG. 27 is a block diagram showing another transmission configuration apparatus according to an exemplary embodiment.

In an embodiment, based on the apparatus shown in FIG. 26, as shown in FIG. 27, the configuration module 262 may include:

a configuration submodule 271, configured to configure a first TCI state set for receiving PDCCH and/or a second TCI state set for receiving PDSCH for the terminal according to each of the first messages, the first TCI state set includes a first corresponding relationship between a TCI state identifier for receiving a PDCCH and an SSB identifier, and the second TCI state set includes a second corresponding relationship between a TCI state identifier for receiving PDSCH and the SSB identifier.

Figure 28:
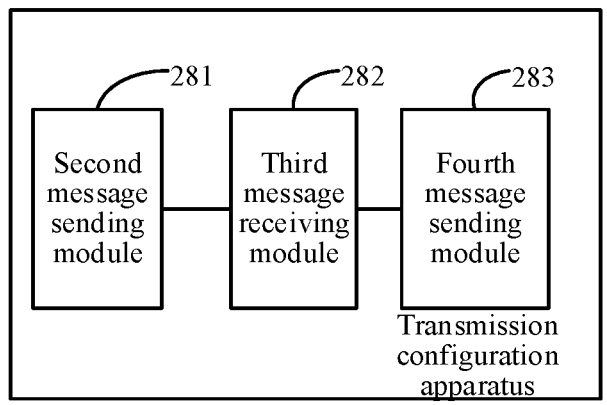
FIG. 28 is a block diagram showing another transmission configuration apparatus according to an exemplary embodiment.

In an embodiment, based on the apparatus shown in FIG. 27, as shown in FIG. 28, the apparatus may further include:

a second message sending module 281, configured to send a second message of random access feedback corresponding to the first message with respect to the second SSB to the terminal according to each of the first messages, where second SSB is one of the first SSBs corresponding to each of the first messages;

a third message receiving module 282, configured to receive a third message for characterizing contention resolution sent by the terminal;

a fourth message sending module 283, configured to send to the terminal a fourth message for characterizing success of the contention resolution when it is determined that the contention resolution is successful.

It can be seen from the above embodiment that the second message for random access feedback with respect to the second SSB can be sent to the terminal according to each first message, the second SSB being one of the first SSBs, the third message for characterizing the contention resolution sent by the terminal is received, and when it is determined that the contention resolution is successful, the fourth message for characterizing the success of the contention resolution is sent to the terminal, so that the base station can better determine the random access with the terminal according to each first message, thereby improving the reliability of random access and also improving the quality of service provided by the base station to the terminal.

Figure 29:
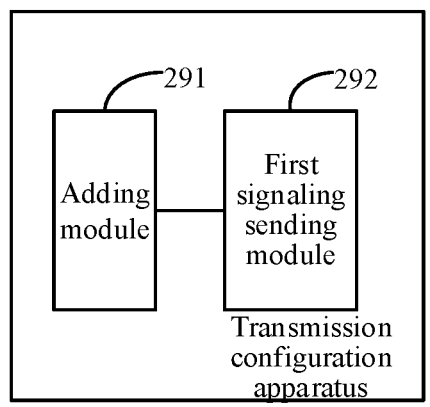
FIG. 29 is a block diagram showing another transmission configuration apparatus according to an exemplary embodiment.

In an embodiment, based on the apparatus shown in FIG. 28, as shown in FIG. 29, the apparatus may further include:

an adding module 291, configured to add the first TCI state set and/or the second TCI state set to the RRC signaling when or after sending the fourth message for indicating successful contention resolution to the terminal; and a first signaling sending module 292, configured to send the RRC signaling to the terminal.

It can be seen from the above embodiment that when or after sending the fourth message for indicating the success of contention resolution to the terminal, the first TCI state set and/or the second TCI state set can be added to the RRC signaling, and the RRC signaling is sent to the terminal, thereby improving the reliability of transmitting the TCI state set and avoiding time delay.

Figure 30:
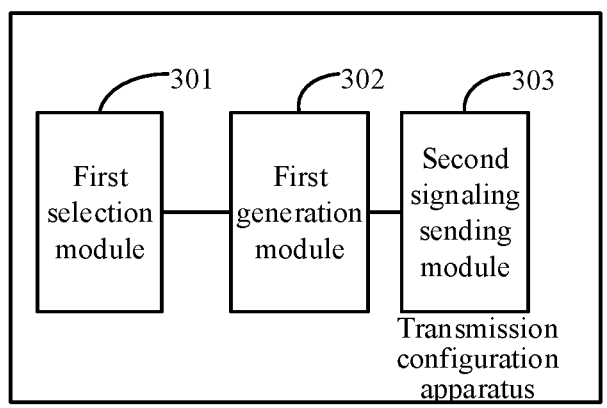
FIG. 30 is a block diagram showing another transmission configuration apparatus according to an exemplary embodiment.

In an embodiment, based on the apparatus shown in FIG. 29, the first TCI state set includes at least two TCI state identifiers; as shown in FIG. 30, the apparatus may further include:

a first selection module 301, configured to select one TCI state identifier from the first TCI state set, where the selected TCI state identifier is the first TCI state identifier;

a first generation module 302, configured to generate a first MAC CE signaling, where the first MAC CE signaling is used to activate the first TCI state identifier, and the first TCI state identifier is used by the terminal to determine the receiving beam that needs to be used for receiving the PDCCH from the base station;

a second signaling sending module 303, configured to send the first MAC CE signaling to the terminal.

It can be seen from the above embodiment that by selecting the first TCI state identifier from the first TCI state set, and using the first MAC CE signaling to activate the first TCI state identifier so that it can be used for the terminal to receive the PDCCH from the base station, the transmission configuration used for PDCCH reception is realized, and the reliability of the transmission configuration is also improved.

Figure 31:
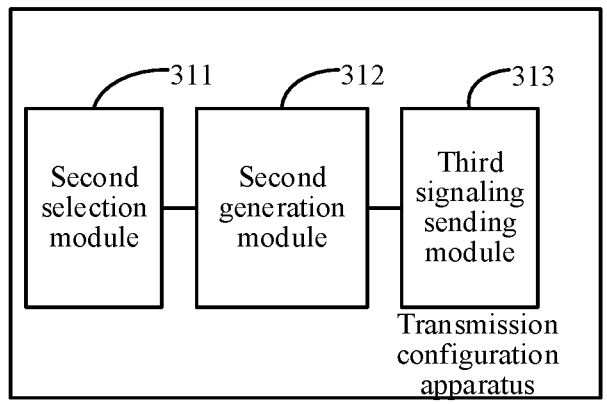
FIG. 31 is a block diagram showing another transmission configuration apparatus according to an exemplary embodiment.

In an embodiment, based on the apparatus shown in FIG. 29, the second TCI state set includes a first number of TCI state identifiers, and the first number is greater than 1. As shown in FIG. 31, the apparatus may also include:

a second selection module 311, configured to select a second number of TCI state identifiers for receiving PDSCH from the first number of TCI state identifiers in the second TCI state set;

a second generation module 312, configured to generate a second MAC CE signaling, where the second MAC CE signaling is used to activate the second number of TCI state identifiers used for receiving PDSCH;

a third signaling sending module 313, configured to send the second MAC CE signaling to the terminal.

It can be seen from the above embodiment that the second number of TCI state identifiers for receiving PDSCH are selected from the first number of TCI state identifiers, the second MAC CE signaling is generated, and the second MAC CE signaling is used to activate the second number of TCI state identifiers for receiving PDSCH and the second MAC CE signaling is sent to the terminal, thereby realizing the transmission configuration for receiving PDSCH and also improving the reliability of the transmission configuration.

Figure 32:
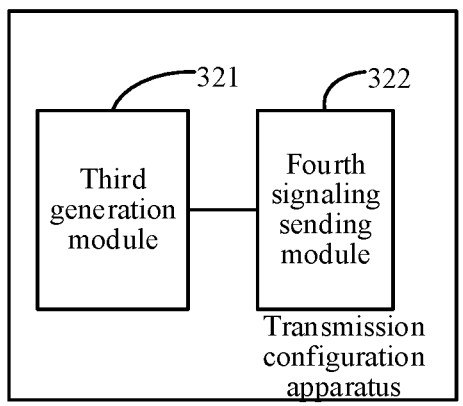
FIG. 32 is a block diagram showing another transmission configuration apparatus according to an exemplary embodiment.

In an embodiment, based on the apparatus shown in FIG. 31, the second number is greater than 1. As shown in FIG. 32, the apparatus may further include:

a third generation module 321, configured to generate a DCI signaling, where the DCI signaling indicates a second TCI state identifier used for receiving PDSCH scheduled by the DCI signaling, and the second TCI state identifier is one TCI state identifier selected by the base station from the second number of TCI state identifiers;

a fourth signaling sending module 322, configured to send the DCI signaling to the terminal.

It can be seen from the above embodiment that by generating the DCI signaling, the DCI signaling indicating the second TCI state identifier for receiving PDSCH scheduled by the DCI signaling, and the second TCI state identifier being one TCI state identifier selected by the base station from the second number of TCI state identifiers, and by sending the DCI signaling to the terminal, the transmission configuration for receiving PDSCH scheduled by the DCI signaling is realized, and the reliability of the transmission configuration is also improved.

As for the apparatus embodiments, since they basically correspond to the method embodiments, the relevant part can refer to the part of the description of the method embodiments. The apparatus embodiments described above are merely illustrative. The units described above as separate components may or may not be physically separated, and the components displayed as units may or may not be physical units, that is, they may be located in one place, or may be distributed to multiple network units. Some or all of the modules can be selected according to actual needs to achieve the objectives of the solutions of the present disclosure. Those of ordinary skill in the art can understand and implement it without creative work.

The present disclosure also provides a non-transitory computer-readable storage medium on which a computer program is stored, and the computer program is configured to execute the transmission configuration method described in any one of FIGS. 1 to 8.

The present disclosure also provides a non-transitory computer-readable storage medium on which a computer program is stored, and the computer program is configured to execute the transmission configuration method described in any one of FIGS. 9 to 14.

The present disclosure also provides a transmission configuration apparatus, the apparatus is used in a terminal, and the base station sends one or more SSBs to the terminal, the apparatus including:

a processor; and a memory for storing instructions executable by the processor;

where the processor is configured to:

detect one or more first SSBs that can trigger random access; and send a first message for initiating random access corresponding to respective one of the first SSBs to the base station, so that the base station configures a TCI state set for the terminal according to each of the first messages.

Figure 33:
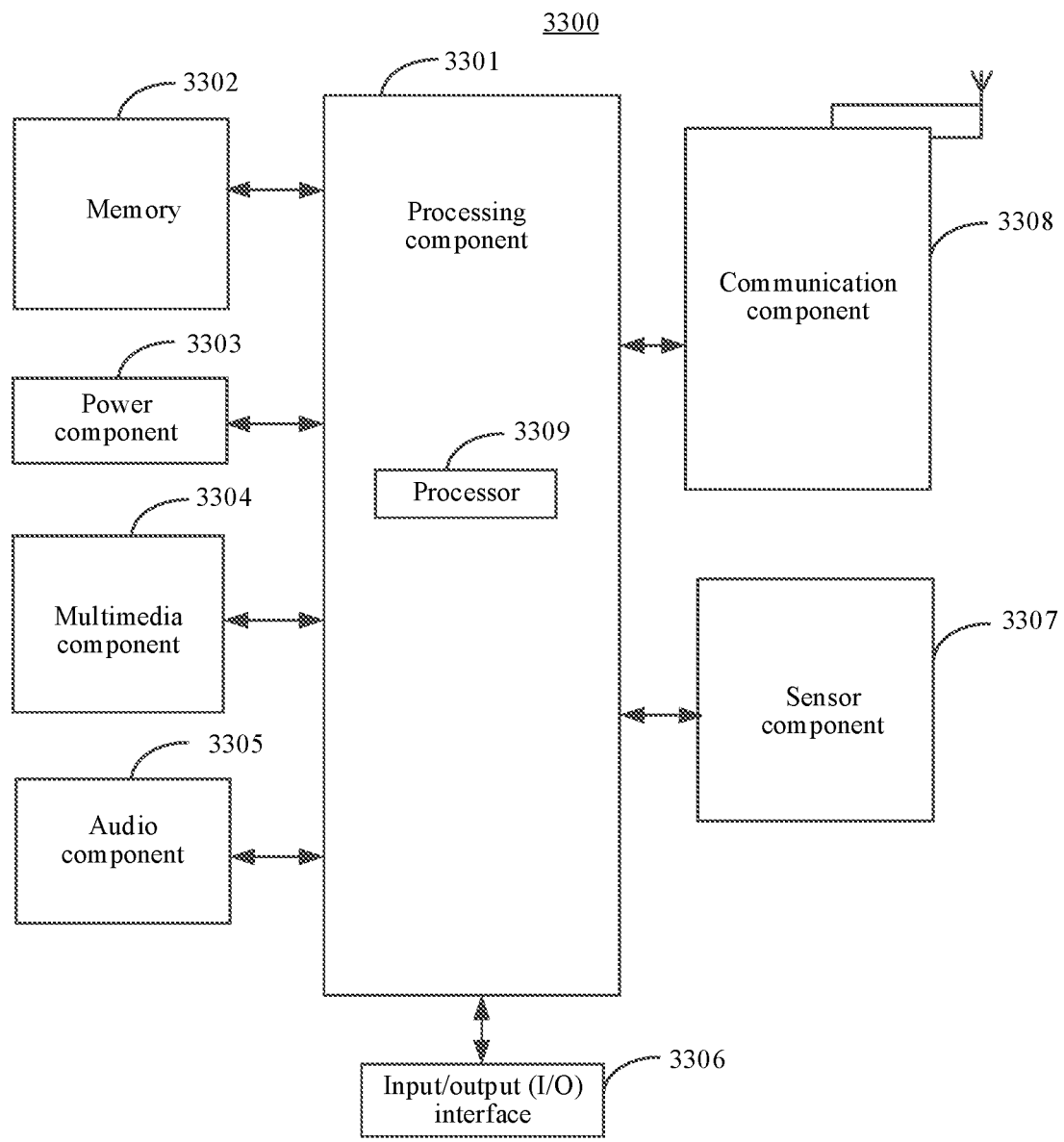
FIG. 33 is a schematic structural diagram showing a transmission configuration apparatus according to an exemplary embodiment.

FIG. 33 is a schematic structural diagram illustrating a transmission configuration apparatus according to an exemplary embodiment. As shown in FIG. 33, the transmission configuration apparatus 3300 according to an exemplary embodiment may be a computer, a mobile phone, a digital broadcast terminal, a messaging apparatus, a gaming console, a tablet, a medical apparatus, exercise equipment, a personal digital assistant, and other terminals.

Referring to FIG. 33, the apparatus 3300 may include one or more of the following components: a processing component 3301, a memory 3302, a power component 3303, a multimedia component 3304, an audio component 3305, an input/output (I/O) interface 3306, a sensor component 3307, and a communication component 3308.

The processing component 3301 typically controls overall operations of the apparatus 3300, such as the operations associated with display, telephone calls, data communications, camera operations, and recording operations. The processing component 3301 may include one or more processors 3309 to execute instructions to perform all or part of the steps in the above described methods. Moreover, the processing component 3301 may include one or more modules which facilitate the interaction between the processing component 3301 and other components. For instance, the processing component 3301 may include a multimedia module to facilitate the interaction between the multimedia component 3304 and the processing component 3301.

The memory 3302 is configured to store various types of data to support the operation of the apparatus 3300. Examples of such data include instructions for any applications or methods operated on the apparatus 3300, contact data, phonebook data, messages, pictures, video, etc. The memory 3302 may be implemented using any type of volatile or non-volatile storage devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3303 provides power to various components of the apparatus 3300. The power component 3303 may include a power management system, one or more power sources, and any other components associated with the generation, management, and distribution of power in the apparatus 3300.

The multimedia component 3304 includes a screen providing an output interface between the apparatus 3300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3304 includes a front camera and/or a rear camera. The front camera and the rear camera may receive an external multimedia datum while the apparatus 3300 is in an operation mode, such as a photographing mode or a video mode. Each of the front camera and the rear camera may be a fixed optical lens system or have focus and optical zoom capability.

The audio component 3305 is configured to output and/or input audio signals. For example, the audio component 3305 includes a microphone ("MIC") configured to receive an external audio signal when the apparatus 3300 is in an operation mode, such as a call mode, a recording mode, and a voice recognition mode. The received audio signal may be further stored in the memory 3302 or transmitted via the communication component 3308. In some embodiments, the audio component 3305 further includes a speaker to output audio signals.

The I/O interface 3306 provides an interface between the processing component 3301 and peripheral interface modules, such as a keyboard, a click wheel, buttons, and the like. The buttons may include, but are not limited to, a home button, a volume button, a starting button, and a locking button.

The sensor component 3307 includes one or more sensors to provide status assessments of various aspects of the apparatus 3300. For instance, the sensor component 3307 may detect an open/closed status of the apparatus 3300, relative positioning of components, e.g., the display and the keypad, of the apparatus 3300, a change in position of the apparatus 3300 or a component of the apparatus 3300, a presence or absence of user contact with the apparatus 3300, an orientation or an acceleration/deceleration of the apparatus 3300, and a change in temperature of the apparatus 3300. The sensor component 3307 may include a proximity sensor configured to detect the presence of nearby objects without any physical contact. The sensor component 3307 may also include a light sensor, such as a CMOS or CCD image sensor, for use in imaging applications. In some embodiments, the sensor component 3307 may also include an accelerometer sensor, a gyroscope sensor, a magnetic sensor, a pressure sensor, or a temperature sensor.

The communication component 3308 is configured to facilitate communication, wired or wirelessly, between the apparatus 3300 and other devices. The apparatus 3300 can access a wireless network based on a communication standard, such as WiFi, 2G, or 3G, or a combination thereof. In one exemplary embodiment, the communication component 3308 receives a broadcast signal or broadcast associated information from an external broadcast management system via a broadcast channel. In one exemplary embodiment, the communication component 3308 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 3300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 3302, executable by the processor 3309 in the apparatus 3300, for performing the above-described methods. For example, the non-transitory computer-readable storage medium may be a ROM, a RAM, a CD-ROM, a magnetic tape, a floppy disc, an optical data storage apparatus, and the like.

When the instructions in the storage medium are executed by the processor, the apparatus 3300 can execute any of the above described transmission configuration methods.

The present disclosure also provides a transmission configuration apparatus, the apparatus is used for a base station, the base station sends one or more SSBs to the terminal, and the apparatus includes:
a processor; and
a memory for storing instructions executable by the processor;
where the processor is configured to:
receive one or more first messages sent by the terminal for initiating random access, the first messages being corresponding to a first SSB that is detected by the terminal to be capable of triggering random access;
configure a TCI state set for the terminal according to each of the first messages.

Figure 34:
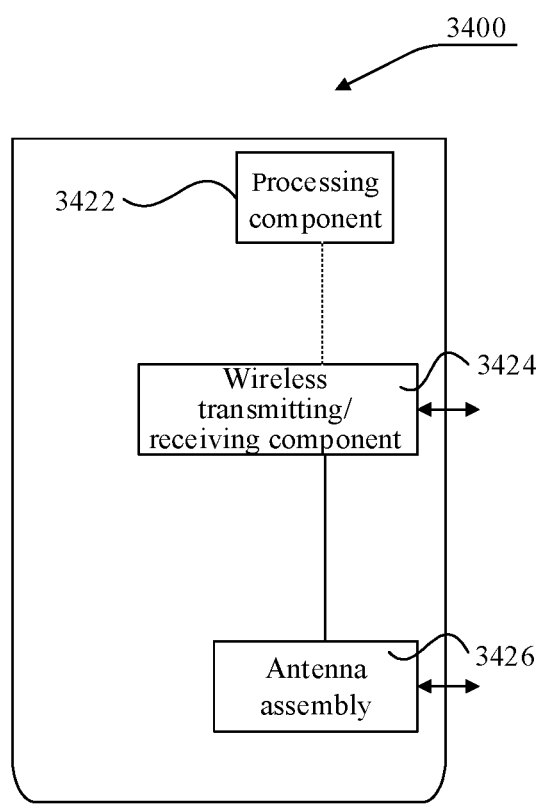
FIG. 34 is a schematic structural diagram showing a transmission configuration apparatus according to an exemplary embodiment.

FIG. 34 is a structural diagram of a transmission configuration apparatus shown in accordance with an exemplary embodiment. As shown in FIG. 34, the apparatus 3400 may be provided as a base station. Referring to FIG. 34, the apparatus 3400 includes a processing component 3422, a wireless transmitting/receiving component 3424, an antenna assembly 3426, and a signal processing part specific to the wireless interface, and the processing component 3422 may further include one or more processors.

One of the processors in the processing component 3422 may be configured to perform any of the above described transmission configuration methods.

It will be appreciated that the present disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A transmission configuration method, comprising:
receiving, by a terminal, one or more synchronization signal blocks (SSBs) from a base station;
detecting, by the terminal, one or more first SSBs capable of triggering random access from the one or more SSBs;
sending, by the terminal, to the base station one or more first messages for initiating the random access and the one or more first messages are respectively corresponding to the one or more first SSBs, so that the base station configures a transmission configuration indication (TCI) state set for the terminal according to the one or more first messages;
receiving, by the terminal, a second message sent by the base station and used for performing random access feedback with respect to a second SSB, wherein the second SSB is any one of the one or more first SSBs;
sending, by the terminal, a third message for characterizing contention resolution to the base station according to the second message;
receiving, by the terminal, a fourth message sent by the base station and used for characterizing success of the contention resolution; and
receiving, by the terminal, a radio resource control (RRC) signaling sent by the base station, wherein the RRC signaling comprises a first TCI state set for receiving physical downlink control channel (PDCCH) or a second TCI state set for receiving physical downlink shared channel (PDSCH) configured by the base station for the terminal, the first TCI state set comprises a first corresponding relationship between a TCI state identifier for receiving the PDCCH and an SSB identifier, and the second TCI state set comprises a second corresponding relationship between a TCI state identifier for receiving the PDSCH and the SSB identifier;

wherein the first TCI state set comprises at least two TCI state identifiers; and the method further comprises:

receiving, by the terminal, a first medium access control (MAC) control element (CE) signaling sent by the base station, wherein the first MAC CE signaling is used to activate a first TCI state identifier, and the first TCI state identifier is one TCI state identifier selected by the base station from the first TCI state set and used for the terminal to determine a receiving beam to be used in response to receiving the PDCCH from the base station;

determining, by the terminal, a first SSB identifier corresponding to the first TCI state identifier according to the first corresponding relationship; and receiving, by the terminal, the PDCCH by using a first receiving beam, wherein the first receiving beam is the same as the SSB designated by or corresponding to the first SSB identifier.

2. The method according to claim 1, wherein detecting, by the terminal, the one or more first SSBs capable of triggering the random access comprises:

in response to detecting an initial SSB meeting a specified received power condition within a specified detection window, determining, by the terminal, the initial SSB as a first SSB; and in response to detecting an SSB other than the initial SSB meeting the specified received power condition within the specified detection window, determining, by the terminal, the SSB as the first SSB.

3. The method according to claim 2, wherein the specified received power condition is that a received power of the SSB is greater than a specified power threshold;

and the method further comprises:

in response to detecting that a specified stop condition is met, stopping, by the terminal, SSB detection, wherein the specified stop condition comprises at least one of followings:

detection of all SSBs to be detected is completed;

a specified number of the one or more first SSBs are detected; or there is a need to start monitoring a random access feedback corresponding to the random access initiated by the initial SSB.

4. The method according to claim 1, wherein detecting, by the terminal, the one or more first SSBs capable of triggering the random access comprises:

in response to detecting an initial SSB meeting a specified received power condition within a specified detection window, determining, by the terminal, the initial SSB as a first SSB;

in response to detecting an SSB other than the initial SSB meeting the specified received power condition within the specified detection window, calculating, by the terminal, a difference between a received power of the initial SSB and a specified offset value; and in response to determining that a received power of the SSB is greater than the difference, determining, by the terminal, the SSB as the first SSB.

5. The method according to claim 1, wherein sending, by the terminal, to the base station the one or more first messages for initiating the random access and the one or more first messages are respectively corresponding to the one or more first SSBs comprises:

determining, by the terminal, a random access time-frequency resource and a random access preamble corresponding to a first SSB; and sending, by the terminal, a first message corresponding to the first SSB to the base station through the random access time-frequency resource corresponding to the first SSB, wherein the first message corresponding to the first SSB comprises the random access preamble corresponding to the first SSB.

6. The method according to claim 1, wherein the receiving, by the terminal, the second message sent by the base station and used for performing the random access feedback with respect to the second SSB comprises:

receiving, by the terminal, the second message within a specified time period, wherein the specified time period comprises a time period for receiving the random access feedback and the time period is corresponding to a first SSB.

7. The method according to claim 1, wherein the second TCI state set comprises a first number of TCI state identifiers, and the first number is greater than 1;

and the method further comprises:

receiving, by the terminal, a second medium access control (MAC) control element (CE) signaling sent by the base station, wherein the second MAC CE signaling is used to activate a second number of TCI state identifiers for receiving the PDSCH, and the second number of TCI state identifiers are selected by the base station from the first number of TCI state identifiers in the second TCI state set.

8. The method according to claim 7, wherein the second number is greater than 1; and the method further comprises:

receiving, by the terminal, a downlink control information (DCI) signaling sent by the base station, wherein the DCI signaling indicates a second TCI state identifier used for receiving the PDSCH scheduled by the DCI signaling, and the second TCI state identifier is one TCI state identifier selected by the base station from the second number of TCI state identifiers;

determining, by the terminal, a second SSB identifier corresponding to the second TCI state identifier according to the second corresponding relationship; and receiving, by the terminal, the PDSCH scheduled by the DCI signaling by using a second receiving beam, wherein the second receiving beam is the same as the SSB designated by or corresponding to the second SSB identifier.

9. A transmission configuration method, comprising:

sending, by a base station, one or more synchronization signal blocks (SSBs) to a terminal;

receiving, by the base station, one or more first messages for initiating random access sent by the terminal, wherein the one or more first messages respectively correspond to one or more first SSBs detected by the terminal from the one or more SSBs and capable of triggering the random access; and configuring, by the base station, a transmission configuration indication (TCI) state set for the terminal according to the one or more first messages, wherein configuring, by the base station, the TCI state set for the terminal according to the one or more first messages comprises:

configuring, by the base station, a first TCI state set for receiving physical downlink control channel (PDCCH) or a second TCI state set for receiving physical downlink shared channel (PDSCH) for the terminal according to the one or more first messages, wherein the first TCI state set comprises a first corresponding relationship between a TCI state identifier for receiving the PDCCH and an SSB identifier, and the second TCI state set comprises a second corresponding relationship between a TCI state identifier for receiving the PDSCH and the SSB identifier; and wherein the method further comprises:

sending, by the base station, to the terminal a second message of random access feedback corresponding to a first message according to the one or more first messages, wherein the first message is with respect to a second SSB, and the second SSB is one SSB of the one or more first SSBs:

receiving, by the base station, a third message for characterizing contention resolution sent by the terminal;

in response to determining that the contention resolution is successful, sending, by the base station, to the terminal a fourth message for characterizing success of the contention resolution;

adding, by the base station, the first TCI state set or the second TCI state set to a radio resource control (RRC) signaling; and sending, by the base station, the RRC signaling to the terminal;

wherein the first TCI state set comprises at least two TCI state identifiers; and the method further comprises:

selecting, by the base station, one TCI state identifier from the first TCI state set, wherein the selected TCI state identifier is a first TCI state identifier;

generating, by the base station, a first medium access control (MAC) control element (CE) signaling, wherein the first MAC CE signaling is used to activate the first TCI state identifier, and the first TCI state identifier is used by the terminal to determine a receiving beam to be used in response to receiving the PDCCH from the base station; and sending, by the base station, the first MAC CE signaling to the terminal.

10. The method according to claim 9, wherein the second TCI state set comprises a first number of TCI state identifiers, and the first number is greater than 1; and the method further comprises:

selecting, by the base station, a second number of TCI state identifiers for receiving the PDSCH from the first number of TCI state identifiers in the second TCI state set;

generating, by the base station, a second medium access control (MAC) control element (CE) signaling, wherein the second MAC CE signaling is used to activate the second number of TCI state identifiers for receiving the PDSCH; and sending, by the base station, the second MAC CE signaling to the terminal.

11. The method according to claim 10, wherein the second number is greater than 1; and the method further comprises:

generating, by the base station, a downlink control information (DCI) signaling, wherein the DCI signaling indicates a second TCI state identifier used for receiving the PDSCH scheduled by the DCI signaling, and the second TCI state identifier is one TCI state identifier selected by the base station from the second number of TCI state identifiers; and sending, by the base station, the DCI signaling to the terminal.

12. A terminal, comprising:
a processor; and
a memory for storing instructions executable by the processor;
wherein the processor is configured to:
receive one or more synchronization signal blocks (SSBs) from a base station;
detect one or more first SSBs capable of triggering random access from the one or more SSBs;
send to the base station one or more first messages for initiating the random access and the one or more first messages are respectively corresponding to the one or more first SSBs, so that the base station configures a transmission configuration indication (TCI) state set for the terminal according to the one or more first messages,
receive a second message sent by the base station and used for performing random access feedback with respect to a second SSB, wherein the second SSB is any one of the one or more first SSBs:
send a third message for characterizing contention resolution to the base station according to the second message; and
receive a fourth message sent by the base station and used for characterizing success of the contention resolution;
receive a radio resource control (RRC) signaling sent by the base station, wherein the RRC signaling comprises a first TCI state set for receiving physical downlink control channel (PDCCH) or a second TCI state set for receiving physical downlink shared channel (PDSCH) configured by the base station for the terminal, the first TCI state set comprises a first corresponding relationship between a TCI state identifier for receiving the PDCCH and an SSB identifier, and the second TCI state set comprises a second corresponding relationship between a TCI state identifier for receiving the PDSCH and the SSB identifier;
wherein the first TCI state set comprises at least two TCI state identifiers; and the processor is further configured to:
receive a first medium access control (MAC) control element (CE) signaling sent by the base station, wherein the first MAC CE signaling is used to activate a first TCI state identifier, and the first TCI state identifier is one TCI state identifier selected by the base station from the first TCI state set and used for the terminal to determine a receiving beam to be used in response to receiving the PDCCH from the base station;
determine a first SSB identifier corresponding to the first TCI state identifier according to the first corresponding relationship; and
receive the PDCCH by using a first receiving beam, wherein the first receiving beam is the same as the SSB designated by or corresponding to the first SSB identifier.

13. The terminal according to claim 12, wherein the processor is further configured to:
in response to detecting an initial SSB meeting a specified received power condition within a specified detection window, determine the initial SSB as a first SSB; and
in response to detecting an SSB other than the initial SSB meeting the specified received power condition within the specified detection window, determine the SSB as the first SSB.

* * * * *